(12) United States Patent
Fukumura et al.

(10) Patent No.: US 8,132,968 B2
(45) Date of Patent: Mar. 13, 2012

(54) BEARING UNIT FOR WHEEL

(75) Inventors: Yoshikazu Fukumura, Iwata (JP); Masayuki Kuroda, Iwata (JP); Hisaaki Kura, Iwata (JP); Shin Tomogami, Iwata (JP); Hiroshi Kawamura, Iwata (JP); Shigeaki Fukushima, Iwata (JP)

(73) Assignee: NTN Corporation, Osaka (JP)

( * ) Notice: Subject to any disclaimer, the term of this patent is extended or adjusted under 35 U.S.C. 154(b) by 467 days.

(21) Appl. No.: 12/308,254

(22) PCT Filed: May 15, 2007

(86) PCT No.: PCT/JP2007/059938
§ 371 (c)(1),
(2), (4) Date: Dec. 11, 2008

(87) PCT Pub. No.: WO2008/001554
PCT Pub. Date: Jan. 3, 2008

(65) Prior Publication Data
US 2010/0119186 A1      May 13, 2010

(30) Foreign Application Priority Data

Jun. 28, 2006   (JP) ................................. 2006-178352

(51) Int. Cl.
 *F16C 19/18*   (2006.01)
 *F16C 13/00*   (2006.01)
 *F16C 43/00*   (2006.01)
(52) U.S. Cl. ......... 384/544; 384/589; 384/537; 464/178
(58) Field of Classification Search .................. 384/449, 384/537, 544, 559, 589; 464/145, 178; 301/105.1; 180/254, 258–259
See application file for complete search history.

(56) References Cited

U.S. PATENT DOCUMENTS

| | | | | |
|---|---|---|---|---|
| 3,237,288 A | * | 3/1966 | Hogan et al. | 29/894.362 |
| 4,359,128 A | * | 11/1982 | Krude | 180/258 |
| 4,421,197 A | * | 12/1983 | Chandioux | 180/258 |
| 4,529,254 A | * | 7/1985 | Krude | 384/449 |
| 4,775,190 A | * | 10/1988 | Jacob | 384/544 |
| 5,430,926 A | * | 7/1995 | Hartford | 29/434 |
| 5,580,313 A | * | 12/1996 | Jacob et al. | 464/145 |
| 5,797,801 A | * | 8/1998 | Jacob | 464/145 |
| 6,079,512 A | * | 6/2000 | Krisher | 180/259 |
| 6,196,639 B1 | * | 3/2001 | Di Ponio et al. | 384/544 |

(Continued)

FOREIGN PATENT DOCUMENTS

JP     8-226426     9/1996

(Continued)

OTHER PUBLICATIONS

Patent Cooperation Treaty (PCT) International Preliminary Report on Patentability, issued Jan. 20, 2009 in corresponding International Application No. PCT/JP2007/059938.

(Continued)

*Primary Examiner* — Marcus Charles
(74) *Attorney, Agent, or Firm* — Wenderoth, Lind & Ponack, LLP

(57) ABSTRACT

A cylindrical pilot portion (72) to be fitted to an inner periphery of a wheel (80) is formed at an inner diameter part of a brake rotor (70). A shape of a hub wheel, in particular, the shape on an outboard side is thus simplified, and the hub wheel can be formed at low cost through cold forging or the like.

4 Claims, 25 Drawing Sheets

U.S. PATENT DOCUMENTS

| | | | |
|---|---|---|---|
| 6,702,682 B2 * | 3/2004 | Jacob | 464/145 |
| 6,857,835 B2 * | 2/2005 | Wang et al. | 384/589 |
| 6,991,380 B2 * | 1/2006 | Wang et al. | 384/544 |
| 7,195,399 B2 * | 3/2007 | Myers et al. | 384/559 |
| 7,465,233 B2 * | 12/2008 | Tajima et al. | 384/544 |
| 2002/0068639 A1 * | 6/2002 | Tajima et al. | 464/178 |
| 2006/0117903 A1 | 6/2006 | Kobayashi et al. | |
| 2006/0192423 A1 * | 8/2006 | Song et al. | 301/105.1 |

FOREIGN PATENT DOCUMENTS

| | | | |
|---|---|---|---|
| JP | 2003294031 A * | 10/2003 | |
| JP | 2004-36851 | 2/2004 | |
| JP | 2004-98885 | 4/2004 | |
| JP | 2004144182 A * | 5/2004 | |
| JP | 2005-193757 | 7/2005 | |
| JP | 2005-231475 | 9/2005 | |
| JP | 2005-256938 | 9/2005 | |
| JP | 2006-111070 | 4/2006 | |

OTHER PUBLICATIONS

International Search Report issued Jul. 31, 2007 in the International (PCT) Application of which the present application is the U.S. National Stage.

* cited by examiner

BEARING UNIT FOR WHEEL

This application is the National Stage of International Application No. PCT/JP2007/059938, filed May 15, 2007.

BACKGROUND OF THE INVENTION

1. Technical Field

The present invention relates to a bearing unit for wheel for supporting a wheel (regardless of a drive wheel or a driven wheel) of an automobile.

2. Description of Related Art

As shown in FIG. 30, a drive shaft 1 for transmitting power from an engine to a drive wheel has a configuration in which a fixed type constant velocity universal joint J1 on an outboard side (a vehicle body side part in a vehicle width direction) and a slidable type constant velocity universal joint J2 on an inboard side (vehicle body center in the vehicle width direction) are connected with an intermediate shaft 2. The constant velocity universal joint J1 on the outboard side is connected to a hub wheel 4 that is supported in a freely rotatable manner by a wheel bearing 3, and the constant velocity universal joint J2 on the inboard side is connected to a differential 5.

The wheel bearing 3 has an inner ring 3a fixed to an outer periphery of the hub wheel 4, an outer ring 3b fixed to a knuckle member 6 that extends from a suspension device on the vehicle body side, and a rolling element 3c arranged in double rows between the inner ring 3a and the outer ring 3b. Normally, the inner ring 3a is fixed to the outer periphery of the hub wheel 4 by being press fit thereinto. The outer ring 3b is usually fixed to the knuckle member 6 by bolting a flange 3b1 of the outer ring 3b to the knuckle member 6.

The conventional drive shaft 1 is assembled to the vehicle by inserting a shaft end on the outboard side (a stem portion 7a of an outer joint member 7) of the drive shaft 1 into an inner periphery of the hub wheel 4 and screw-fitting a nut 8 to the shaft end that projects from the hub wheel 4 with the hub wheel 4 and the wheel bearing 3 being fixed to the knuckle member 6 in advance (see, e.g., Patent Document 1). With tightening of the nut 8, the entire drive shaft 1 slides to the outboard side, and a shoulder portion 7b of the outer joint member 7 contacts an end face of the inner ring 3a. The outer joint member 7 and the hub wheel 4 are thereby positioned in an axial direction, and a predetermined pre-load is applied to the wheel bearing 3. An outer peripheral surface of the stem portion 7a of the outer joint member 7 and an inner peripheral surface of the hub wheel 4 are connected with each other by a spline (not shown), and a drive power of the engine transmitted to the outer joint member 7 is transmitted to the spline, and furthermore, to the wheel via the hub wheel 4.

A pilot portion 4a is formed at the shaft end on the outboard side of the hub wheel 4. Inner peripheral surfaces of a brake rotor 9 and a wheel W are each fitted into the outer peripheral surface of the pilot portion 4a.

[Patent Document 1] Japanese Laid-Open Patent Publication No. 2004-270855

SUMMARY OF THE INVENTION

As described above, conventionally, the hub wheel 4 has a complicated shape since the pilot portion 4a is formed on the hub wheel 4. Thus, the turning step is essential in manufacturing processes of the hub wheel. Rust proof coating also needs to be performed on the pilot portion. Such aspects are factors that lead to increase in cost of the hub wheel.

When assembling the drive shaft to the vehicle body, there are required complicated tasks of having the knuckle member 6 assembled with the wheel bearing 3 and the hub wheel 4 stand by at a position pivoted from a neutral position in advance with a king pin center as a center, fixing the outboard side constant velocity universal joint J1 to the hub wheel 4 in this state, and fixing the inboard side constant velocity universal joint J2 to the differential 5 after returning the knuckle member 6 to the neutral position. In addition, there are required a great number of fastening tasks such as bolting the outer ring 3b to the knuckle member 6 and tightening the nut 8. Therefore, the assembly step of the drive shaft is complicated, which aspect is the factor leading to increase in cost. Furthermore, a greater number of nuts and bolts are required, so that increase in the number of parts is also a disadvantage in terms of cost. Moreover, a large working space is required since the drive shaft pivots with pivoting of the knuckle member.

The tightening task with the nut can be eliminated by connecting and integrating in advance the outer joint member 7 of the outboard side constant velocity universal joint J1 and the hub wheel 4. However, since a large amount of load acts with traveling of the vehicle, including a moment load during cornering, at the connected part thereof, there is required a connection structure having high strength for withstanding such load and being inexpensive in terms of cost.

It is an object of the present invention to achieve lowered cost of the hub wheel.

Another object is to simplify the assembly step of the bearing unit for wheel to the knuckle member. It is also an object to reduce the number of parts in the bearing unit for wheel so as to simplify the structure thereof.

In order to achieve the above objects, the present invention provides a bearing unit for wheel including an outer member having a plurality of outer races on an inner periphery, an inner member having a plurality of inner races facing the outer races, a plurality of rows of rolling elements arranged between the outer races and the inner races that face with each other, and a hub wheel attached to a wheel, wherein a pilot portion, which is fitted to an inner periphery of the wheel, is arranged on a different member other than the hub wheel.

The shape of the hub wheel is thereby simplified, and the hub wheel can be formed only through a low cost processing method such as cold forging. Rust prevention processing on the hub wheel is also unnecessary.

A different member for arranging the pilot portion may be a brake rotor. Since the brake rotor is normally fabricated through casting, increase in cost is suppressed to a minimum even when the pilot portion is formed on the brake rotor.

Furthermore, in the bearing unit for wheel including an outboard side constant velocity universal joint, an outer peripheral surface of the outer member is fit-in and incorporated to an inner peripheral surface of a knuckle member on a vehicle body side, and a maximum outer diameter dimension of the outboard side constant velocity universal joint is smaller than a minimum inner diameter dimension of the knuckle member. In this case, the term "constant velocity universal joint" includes accessories such as a boot and a boot band. The maximum outer diameter dimension of the outboard side constant velocity universal joint inclusive of these accessories is set smaller than the minimum inner diameter dimension of the knuckle member (this is the same for an inboard side constant velocity universal joint to be described below).

According to such a configuration, the bearing unit can be fixed to the knuckle member by incorporating and fitting in the outer member to the knuckle member from the outboard side while the outer joint member of the outboard side constant velocity universal joint and the hub wheel are connected with each other. Such a task can be carried out simply by pushing the bearing unit in a vehicle axial direction, and the outer member basically does not need to be bolted to the knuckle member. Therefore, the assembling task of the bearing unit to the vehicle can be simplified. The outer joint member and the hub wheel can be connected with each other using a nut, similarly to the conventional art, instead of plastic bonding utilizing a plastic flow of a raw material, welding, or the like.

In fit-in incorporation, when the outer peripheral surface of the outer member is press fit to the inner peripheral surface of the knuckle member, the outer member and the knuckle member can be firmly connected with each other by the press fitting. A bearing clearance is set to a negative clearance by press fitting. In this case, a pre-load application task does not need to be performed by managing tightening torque by the nut, as in the conventional art, and thus the pre-load application task is simplified.

Plastic bonding may be means for connecting the hub wheel and the outer joint member of the outboard side constant velocity universal joint. As one example, the hub wheel and the outer joint member are plastically bonded by press fitting a male part arranged on either one of the hub wheel and the outer joint member to a female part arranged on the other and having a shape different from a shape of the male part. In this case, the male part and the female part are firmly connected and integrated with each other since a partial or entire clearance provided at the jointed portion of the male part and the female part is filled by a plastic flow generated by press fitting. This connection is carried out simply by press fitting one of the male part and the female part to the other, and thus workability thereof is also satisfactory.

The outboard side constant velocity universal joint and the inboard side constant velocity universal joint are connected by way of an intermediate shaft, and the maximum outer diameter dimensions of the constant velocity universal joints on both sides are set smaller than the minimum inner diameter dimension of the knuckle member, so that the bearing unit for wheel can be assembled to the vehicle body while the drive shaft including the outboard side and inboard side constant velocity universal joints and the hub wheel are integrally assembled. Such assembling is carried out by inserting the inboard side constant velocity universal joint and the outboard side constant velocity universal joint sequentially to the inner periphery of the knuckle member, and then press fitting the outer member to the inner periphery of the knuckle member.

According to the present invention, cost for the hub wheel can be lowered.

Furthermore, the assembly step to the vehicle of the bearing unit for wheel including the hub wheel, the bearing, and the outboard side constant velocity universal joint can be simplified. Furthermore, the number of parts of the bearing unit can be reduced, and a structure thereof can be simplified, as well as cost can be lowered.

Figure 1:
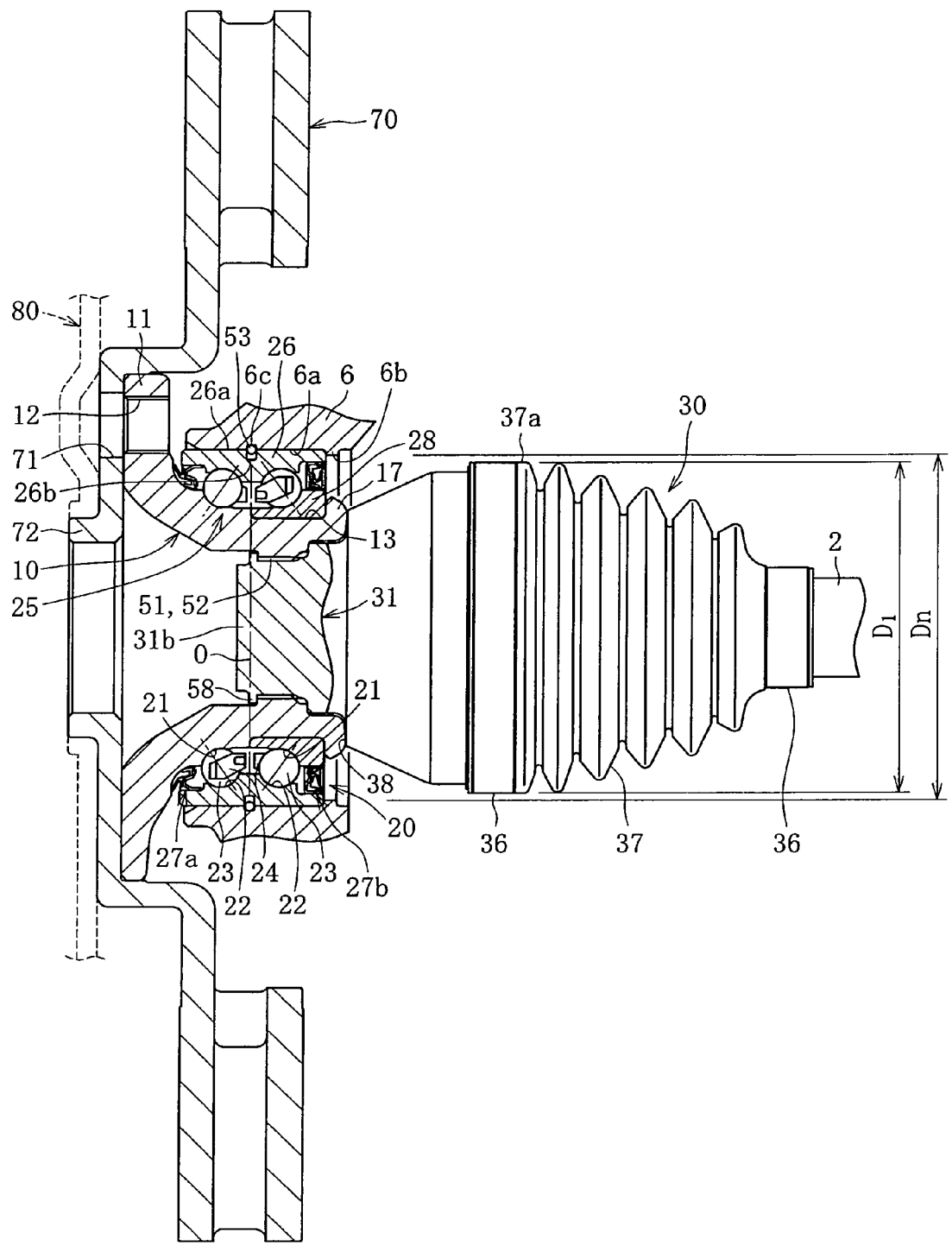
FIG. 1 is a cross-sectional view of a bearing unit for wheel according to a first embodiment.

DESCRIPTION OF SYMBOLS 1 drive shaft
2 intermediate shaft
6 knuckle member
6a inner peripheral surface
6b projection
10 hub wheel
11 wheel attachment flange
20 bearing unit
21 inner race 22 outer race
23 rolling element
24 cage
25 inner member
26 outer member
26a outer peripheral surface
27a seal
27b seal
28 inner ring
28a inner ring
28b inner ring
30 outboard side constant velocity universal joint
31 outer joint member
31a mouse portion
31b stem portion
32 inner joint member
33 torque transmission ball
34 cage
36 boot band
37 boot
38 shoulder surface
40 inboard side constant velocity universal joint
51 male part
52 female part
53 snap ring
56 escape portion
70 brake rotor
72 pilot portion
80 wheel
Dn minimum inner diameter dimension of knuckle member
D1 maximum outer diameter dimension of outboard side constant velocity universal joint
D2 maximum outer diameter dimension of inboard side constant velocity universal joint

DETAILED DESCRIPTION OF THE INVENTION

Embodiments of a bearing unit for wheel according to the present invention will be described in detail below.

FIG. 1 shows a first embodiment of the bearing unit for wheel according to the present invention. The bearing unit is directed to a drive wheel, and is configured by a hub wheel 10, a bearing unit 20, and an outboard side constant velocity universal joint 30.

The hub wheel 10 is hollow, and has a wheel attachment flange 11 for attaching a wheel (not shown) to an outer peripheral surface thereof. A plurality of female screws 12 is formed in a circumferential direction of the wheel attachment flange 11, and a wheel bolt (not shown) for fixing a brake rotor 70 and a wheel 80 is screw-fit to the female screw 12. As opposed to the conventional art, a pilot portion is not arranged on the outboard side of the hub wheel 10, and an outboard side end face of the wheel attachment flange 11 is positioned closest to the outboard side of the hub wheel 10. An inner peripheral surface on the outboard side of the hub wheel 10 has a tapered shape of which diameter reduces substantially linearly towards the inboard side. A small diameter step part 13 formed on the outer peripheral surface of the hub wheel 10 is press fit by an inner ring 28 at an appropriate fastening amount.

Figure 10:
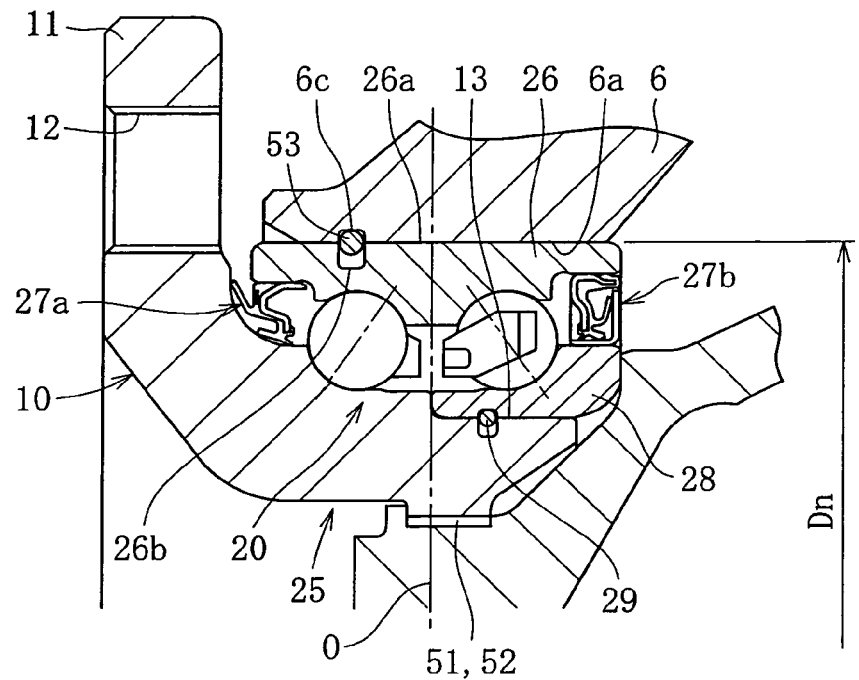
FIG. 10 is a cross-sectional view showing, in an enlarged manner, the main parts of the bearing unit for wheel.
Figure 11:
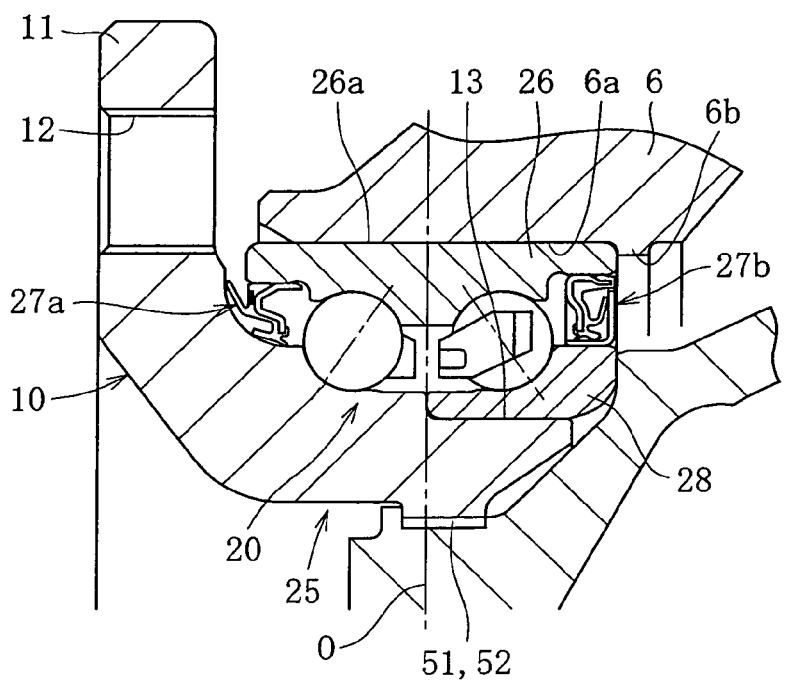
FIG. 11 is a cross-sectional view showing, in an enlarged manner, the main parts of the bearing unit for wheel.

An inboard side shaft end of the small diameter step part 13 of the hub wheel 10 is subjected to orbital forming. In the orbital forming, a cylindrical shaft end part which extends beyond the inboard side end face of the inner ring 28 is formed on the small diameter step part 13, and oscillates a forming tool on an inner diameter side of the projecting portion to plastically deform the projecting portion to the outer diameter side. A flange 17 formed by plastic deformation is closely attached to the inboard side end face of the inner ring 28 to thereby axially position the inner ring 28 and the hub wheel 10. As shown in FIG. 10, the inner ring 28 and the hub wheel 10 may be axially positioned with a snap ring 29 interposed between the inner peripheral surface of the inner ring 28 and the outer peripheral surface of the small diameter step part 13. In a case where sufficient slip-out resistance force is obtained, the inner ring 28 may be simply press fit to the outer peripheral surface of the small diameter step part 13, as shown in FIG. 11.

The bearing unit 20 has a double row angular ball bearing structure arrayed on a rear surface, and has a double row of inner races 21 and outer races 22, a rolling element 23 arranged between the opposing inner race 21 and the outer race 22, and a cage 24 for holding the rolling element row on the outboard side (left side in the drawing) and the rolling element row on the inboard side (right side in the drawing) at equal intervals in the circumferential direction. In the illustrated example, the inner race 21 on the outboard side is formed on the outer peripheral surface of the hub wheel 10, and the inner race 21 on the inboard side is formed on the outer peripheral surface of the inner ring 28. In this case, the hub wheel 10 and the inner ring 28 configure an inner member 25 that has the double row of the inner races.

The outer race 22 is formed on an inner peripheral surface of a ring-shaped integrated outer member 26. An outer peripheral surface 26a of the outer member 26 has a cylindrical surface, the entire part of which excluding a snap ring groove 26b has an even diameter. As different from the outer member according to the conventional art, there is not arranged a flange for attaching to a knuckle member 6. Inner peripheral surfaces at both axial ends of the outer member 26 are press fit and fixed with seals 27a, 27b. A snap ring 53 is interposed between the outer peripheral surface 26a of the outer member 26 and an inner peripheral surface 6a of the knuckle member 6, where the outer member 26 is prevented from slipping out from the knuckle member 6 by engaging the snap ring 53 with the outer member 26 and the knuckle member 6 in the axial direction. FIG. 1 exemplarily shows a case where the snap ring 53 is arranged on an axial center line O of the rolling element 23 on the inboard side and the rolling element 23 on the outboard side.

The seal 27a on the outboard side has a configuration in which a core metal is covered with an elastic material such as rubber and a plurality of (e.g., three) seal lips is formed on an inner diameter side, and is fixed to the outer member 26 by press fitting the core metal to the inner peripheral surface of the outer member 26. The seal lips respectively contact the outer peripheral surface of the hub wheel 10 and the inboard side end face of the flange 11.

The seal 27b on the inboard side is referred to as a cassette seal, and has a configuration in which a plurality of (e.g., three) seal lips formed on the inner diameter side of the core metal is brought into contact with a slinger having a cross-section of a reverse L-shape. The seal 27b is fixed to an opening by press fitting the core metal to the inner peripheral surface of the outer member 26 and press fitting the slinger to the outer peripheral surface of the inner ring 28. The openings at the both ends of the bearing unit 20 are sealed by the seals 27a, 27b, thereby preventing leakage of grease filled inside and entering of water or a foreign substance from outside.

In the bearing unit 20 of the illustrated example, a ball is exemplified as the rolling element 23, but a tapered roller may be used as the rolling element 23 in a case where the vehicle weight is increased.

Figure 4:
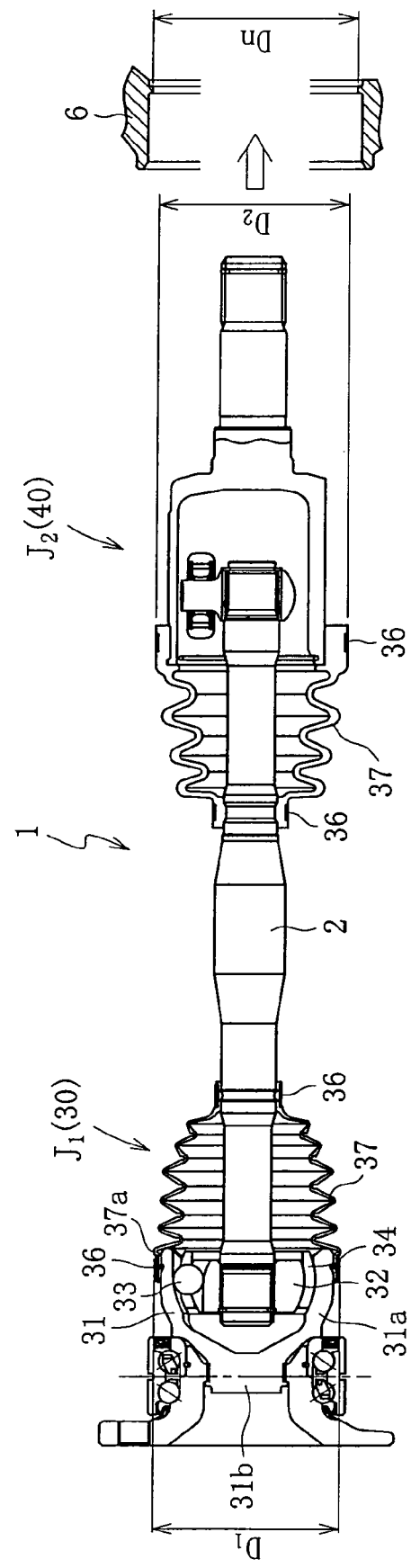
FIG. 4 is a cross-sectional view of a drive shaft.

As shown in FIG. 4, the outboard side constant velocity universal joint 30 is provided at one end on the outboard side of the intermediate shaft 2, and is configured by an outer joint member 31 having a track groove formed on an inner peripheral surface; an inner joint member 32 having a track groove facing the track groove of the outer joint member 31 formed on an outer peripheral surface; torque transmission balls 33 incorporated between the track groove of the outer joint member 31 and the track groove of the inner joint member 32; and a cage 34, interposed between the outer joint member 31 and the inner joint member 32, for holding the torque transmission balls 33 at equal intervals in the circumferential direction. The inner joint member 32 is connected by way of a serration to the shaft end on the outboard side of the intermediate shaft 2 inserted to the inner periphery.

The outer joint member 31 is manufactured through cold forging or the like, and includes a mouse portion 31a for accommodating the inner joint member 32, the cage 34, and the torque transmission balls 33, and a solid stem portion 31b integrally extending in the axial direction from the mouse portion 31a. A large diameter open end and a small diameter open end of an accordion-shaped boot 37 are fixed to the outer peripheral surface on the opening side of the mouse portion 31a and the outer peripheral surface of the intermediate shaft 2 by way of boot bands 36, respectively. Thus, events, such as grease leaking to outside or water or a foreign substance such as dust entering inside the joint, are thereby prevented by covering a space between the outer joint member 31 and the intermediate shaft 2 with the boot 37.

The stem portion 31b of the outer joint member 31 is connected to the hub wheel 10 by means of one of various connection structures to be described later. The connection method may be a reversible connecting manner such as using a nut, but preferably used is an inseparable connection structure in which reversible separation or connection between the hub wheel 10 and the outer joint member 31 is not permitted.

As shown in FIG. 1, when inseparably connecting the hub wheel 10 and the outer joint member 31, a shoulder surface 38 of the outer joint member 31 is brought into contact with the end face on the inboard side of the inner ring 28, and the end face on the outboard side of the inner ring 28 is also brought into contact with the hub wheel 10 in the axial direction, so that the space between the double row inner races 21 is held at a defined dimension and a pre-load (preliminary pre-load) is applied to the bearing unit 20.

The outer peripheral surface 26a of the outer member 26 is fit-in and incorporated in the inner peripheral surface 6a of the knuckle member 6 on the vehicle body.

The fit-in incorporation referred to in this case indicates fitting the outer member 26 to the knuckle member 6 and completing the incorporation thereof. This incorporation can be carried out by press fitting the cylindrical outer peripheral surface 26a of the outer member 26 to the cylindrical inner peripheral surface 6a of the knuckle member 6 from the outboard side.

A projection 6b that is engaged with the end face of the outer member 26 in the axial direction is arranged on the inboard side end of the inner peripheral surface 6a of the knuckle member 6, as necessary. As shown in FIG. 1, when the projection 6b is arranged, the inboard side end face of the outer member 26 that is press fit from the outboard side contacts the projection 6b. Also, a snap ring groove 6c formed on the inner peripheral surface 6a of the knuckle member 6 and a snap ring groove 26b formed on the outer peripheral surface 26a of the outer member 26 face with each other, and the diameter of the snap ring 53 accommodated in the snap ring groove 26b of the outer member 26 elastically expands so as to be engaged with both the knuckle member 6 and the outer member 26 in the axial direction. In a case where sufficient fixation force is obtained simply by press fitting the outer member 26, the projection 6b of the knuckle member 6 may be eliminated as shown in FIG. 10. Alternatively, the snap ring 53 may be eliminated as shown in FIG. 11.

As shown in FIG. 10, in a case where the snap ring 53 is arranged closer to the outboard side with respect to the axial center line O of the rolling element 23 on the inboard side and the rolling element 23 on the outboard side, it is possible to reduce the sliding distance of the snap ring 53 with respect to the inner peripheral surface 6a of the knuckle member when press fitting the outer member 26, whereby avoiding damages on the inner peripheral surface 6a of the knuckle member due to dragging of the snap ring 53.

Compared to a case of bolting the outer member with flange at a plurality of locations of the knuckle member as in the conventional art, the bolt fastening task can be eliminated and the number of parts and the working steps can be reduced accordingly to lower cost by forming the press-fit surface on the outer peripheral surface 26a of the outer member 26 and press fitting and fixing the outer member 26 to the inner periphery of the knuckle member 6.

When outer member 26 is press fit to the knuckle member 6, diameter reducing force in the radial direction acts on the press fit outer member 26, and the bearing clearance is reduced by such diameter reducing force. Therefore, an appropriate amount of negative clearance (e.g., 0 to 100 μm, preferably 0 to 30 μm) can be obtained after the press fitting by appropriately setting the press fitting amount in view of the preliminary pre-load amount. In this case, the pre-load application task by tightening of the nut is unnecessary, and thus the assembly workability of the bearing unit can be further enhanced. In a case where a positive clearance is greater than zero, bearing rigidity becomes insufficient and durability is lowered, whereas in a case where the negative clearance amount is greater than 100 μm, the pre-load becomes excessively large and may cause abnormal heat generation.

In such fit-in incorporation, a maximum outer diameter dimension D1 of the outboard side constant velocity universal joint 30 is set smaller than a minimum inner diameter dimension Dn of the knuckle member 6 (D1<Dn). The outboard side constant velocity universal joint 30 is first inserted to the inner periphery of the knuckle member 6, and then the outer member 26 of the bearing unit 20 is press fit to the inner periphery of the knuckle member 6, so that the hub wheel 10, the bearing unit 20, and the outboard side constant velocity universal joint 30 can be assembled to the vehicle in an assembled state. In assembling, the workability for assembling is also satisfactory since a push-in direction of the assembly is constant.

The "minimum inner diameter dimension Dn" of the knuckle member 6 refers to the inner diameter dimension of the portion at the most inner diameter side of the knuckle member 6. In a case where the projection 6b is arranged on the inner peripheral surface of the knuckle member 6 as in the embodiment shown in FIG. 1, the inner diameter dimension of the projection 6b is equal to the "minimum inner diameter dimension". In a case where the projection 6b is eliminated as shown in FIG. 10, the inner peripheral surface 6a of the knuckle member 6 has the "minimum inner diameter dimension".

The "maximum outer diameter dimension D1" of the outboard side constant velocity universal joint refers to the outer diameter dimension of the portion at the most outer diameter side inclusive of accessories such as the boot 37 and the boot band 36. For instance, in the outboard side constant velocity universal joint 30 shown in FIG. 1, the outer diameter dimension of a boot maximum diameter portion 37a is equal to the maximum outer diameter dimension D1 of the outboard side constant velocity universal joint 30.

As shown also in FIG. 4, assembling to the vehicle is possible even with the drive shaft 1, the hub wheel 10, and the bearing unit 20 being assembled in advance (hereinafter, referred to as drive shaft assembly) by setting a maximum outer diameter dimension D2 of the inboard side constant velocity universal joint 40 of the drive shaft 1 smaller than the minimum inner diameter dimension Dn of the knuckle member 6 (D2<Dn). In other words, the assembling to the vehicle is completed by inserting the drive shaft assembly to the inner periphery of the knuckle member 6 sequentially in the order of the inboard side constant velocity universal joint 40, the intermediate shaft 2, and the outboard side constant velocity universal joint 30, and then press fitting the outer peripheral surface 26a of the outer member 26 to the inner peripheral surface of the knuckle member 6. The working steps at the assembly work site then can be reduced and the workability can be enhanced. In this case, a minimum working space is sufficient since the knuckle member 6 does not need to be pivoted as in the conventional steps. The maximum outer diameter dimension D2 of the inboard side constant velocity universal joint 40 refers to the maximum outer diameter dimension of the inboard side constant velocity universal joint 40 inclusive of accessories such as the boot 37 and the boot band 36, similarly to the outboard side constant velocity universal joint 30.

Figure 5:
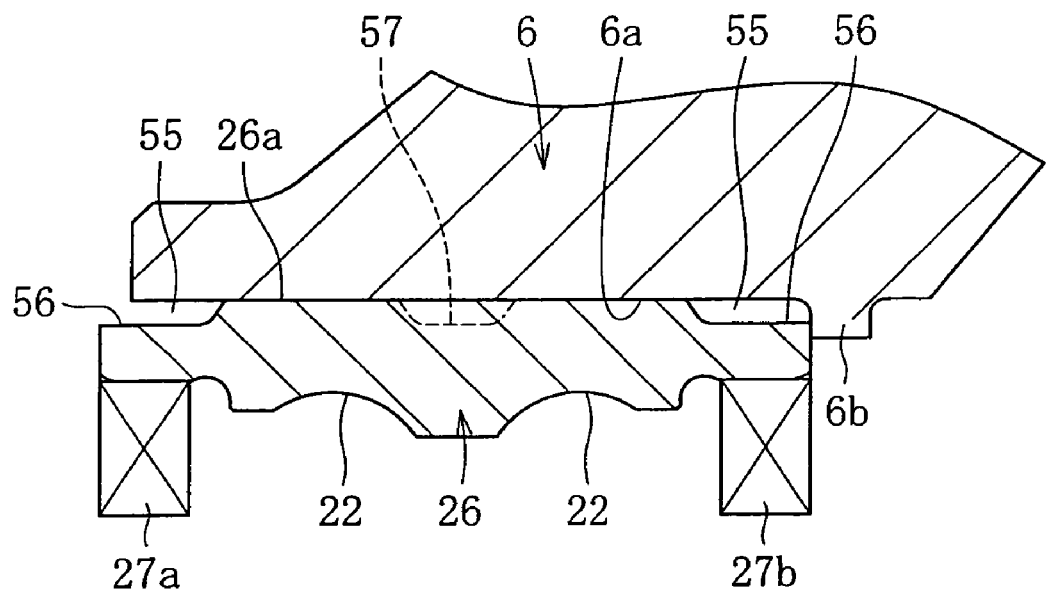
FIG. 5 is a cross-sectional view showing, in an enlarged manner, a press fit portion of an outer member and a knuckle member.

As shown in FIG. 5, clearances 55 are desirably formed respectively between outer diameter regions of the seals 27a, 27b and the inner peripheral surface 6a of the knuckle member 6 facing thereto of the outer peripheral surface 26a of the outer member 26. As shown in the drawing, the clearance 55 may be formed by forming an escape portion (not shown) on the inner peripheral surface 6a of the knuckle member 6, as well as by forming an escape portion 56 on the outer peripheral surface 26a of the outer member 26. The press fitting amount between the outer member 26 and the knuckle member is sufficient as far as ensured at the outer diameter region of the outer race 22, and thus an escape portion 57 may be further formed in the outer diameter region between the outer races 22, as shown with broken line in the drawing. The press-fit area is then reduced and the workability for press fitting can be enhanced, while a defined pre-load can be applied to the bearing unit 20 in press fitting.

In press fitting the outer member 26, the pre-load amount to be applied to the bearing unit 20 can be stabilized by setting the press fitting amount even on the outer diameter side of each of the outer races 22.

Figure 6:
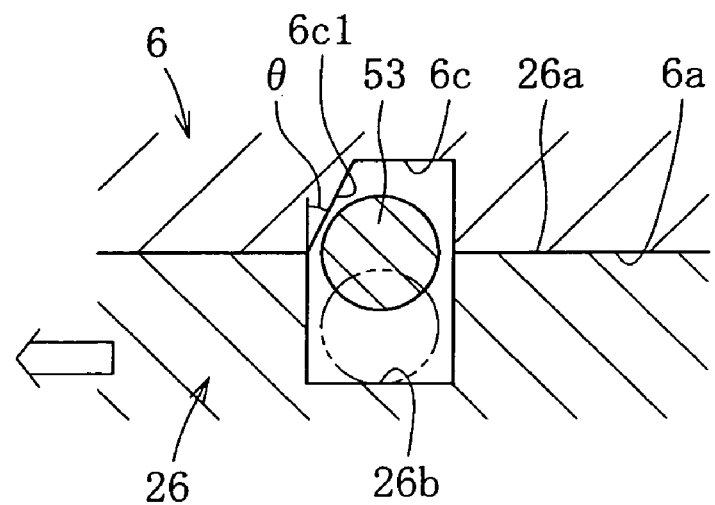
FIG. 6 is a cross-sectional view showing, in an enlarged manner, the press fit portion of the outer member and the knuckle member.

As shown in FIG. 6, an outboard wall surface 6c1 of the snap ring groove 6c may be formed into a tapered surface on the inner peripheral surface 6a of the knuckle member 6. In this case, the diameter of the snap ring 53 is reduced with guidance of the tapered surface 6c1 by pulling the outer member 26 with a predetermined force to the outboard side as shown by an arrow, so that the drive shaft assembly can be separated from the knuckle member 6, and the workability of the maintenance task and the replacement task of the assembly can be enhanced. An angle θ of the tapered surface 6c1 is desirably set to a range of 15° and 30° so as to satisfy both a slip-out prevention effect for fit-in incorporation and the workability for replacement.

Figure 7A:
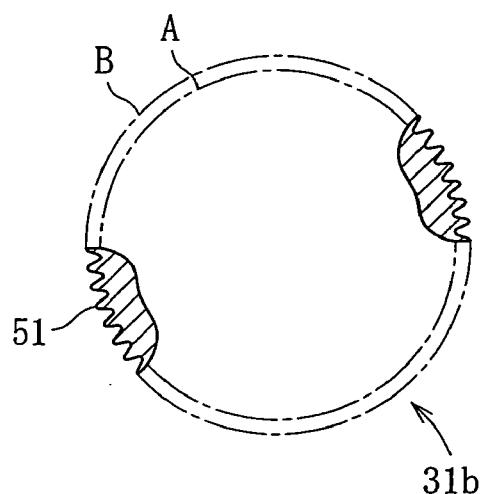
FIG. 7a is a cross-sectional view of a male part at a connected portion of a hub wheel and an outer joint member.
Figure 7B:
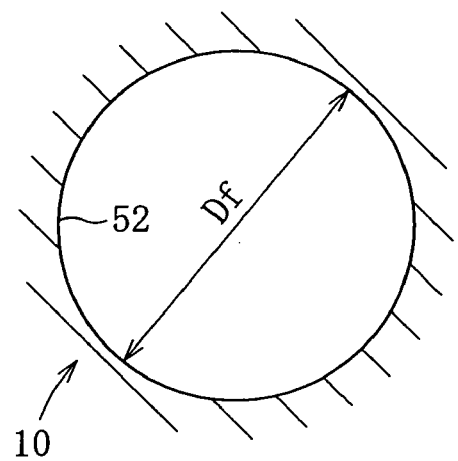
FIG. 7b is also a cross-sectional view of the male part.

The hub wheel 10 and the outer joint member 31 are integrated with each other through plastic bonding. As shown in FIG. 1, the plastic bonding is carried out by forming a male part 51 in one of the hub wheel 10 and the outer joint member 31, forming a female part 52 in a different shape from the male part 51 in the other member, and press fitting the male part 51 and the female part 52 with each other. FIG. 1 exemplarily shows a case where the male part 51 is formed at the stem portion 31b of the outer joint member 31 and the female part 52 is formed at the inboard side end of the hub wheel 10. One of the male part 51 and the female part 52 is formed into a perfect circle shape in cross-section, and the other is formed into a non-perfect circle shape in cross-section. FIG. 7(a) exemplarily shows a case where the male part 51 is formed into a tooth-shaped surface such as a serration and the female part 52 is formed into a cylindrical surface. The male part 51 of the non-perfect circle shape in cross-section is efficiently formed with satisfactory accuracy through cold forging or rolling.

Figure 8:
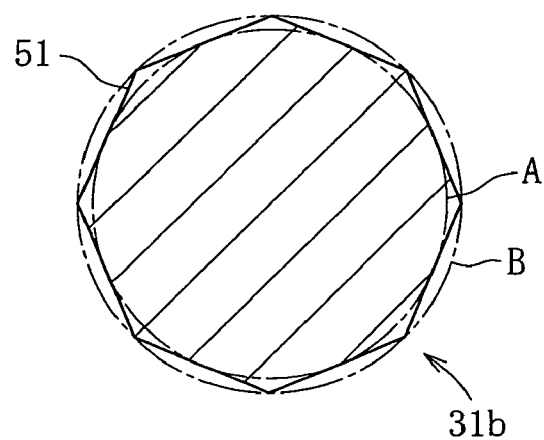
FIG. 8 is a cross-sectional view showing another configuration example of the male part.

In addition, the male part 51 may be in an angled tubular surface, as shown in FIG. 8. In any shape, an inner diameter dimension Df of the female part 52 of the perfect circle shape in cross-section is larger than a diameter of a circle A inscribing a cross-sectional contour of the male part 51 and smaller than a diameter of a circumscribing circle B.

When the male part 51 having the above shape is press fit to the inner periphery of the female part 52, plastic flow is generated at a jointed portion, and a clearance therebetween is entirely or partially filled. The hub wheel 10 and the outer joint member 31 are plastically bonded to be integrated.

Figure 9:
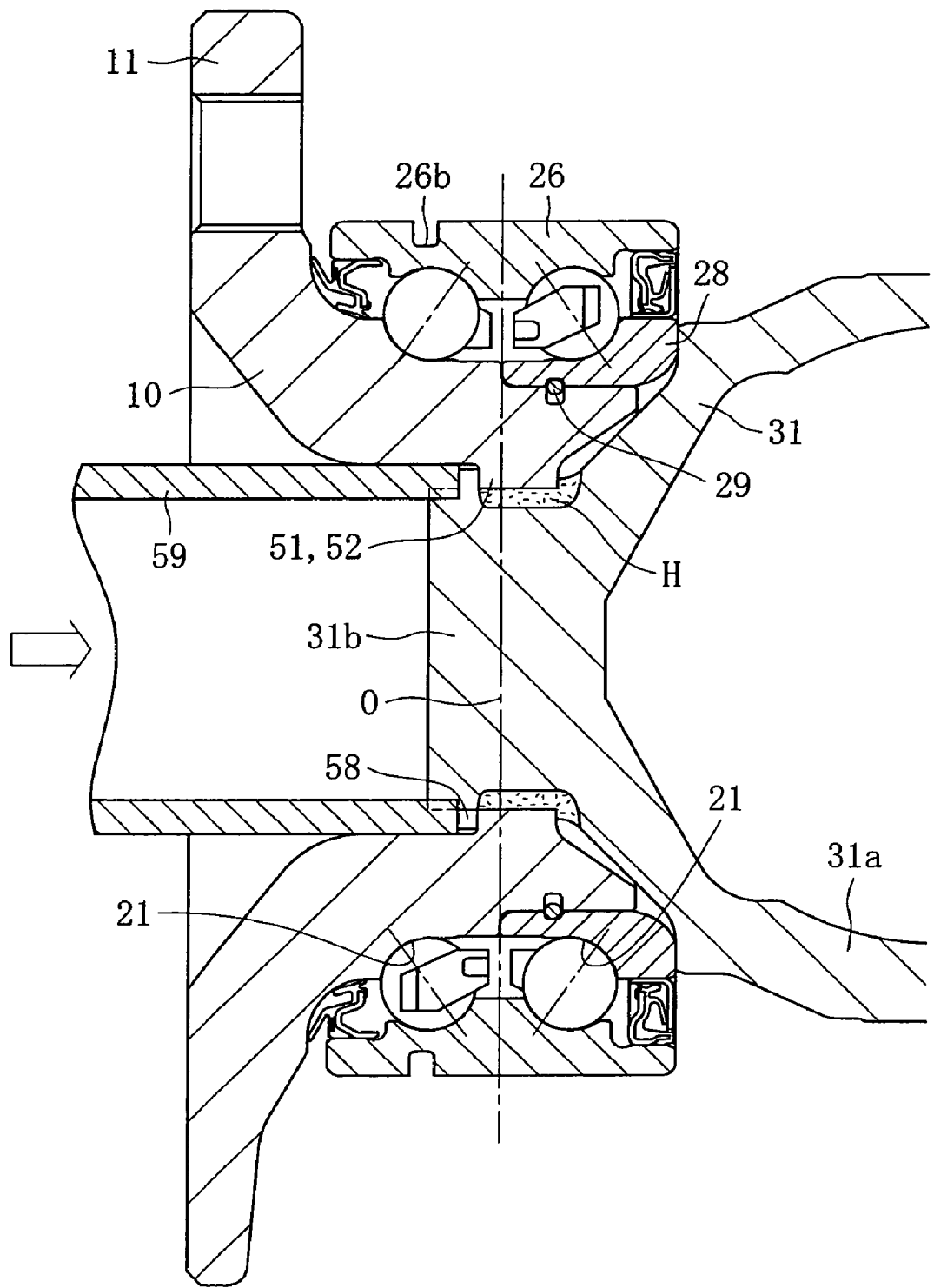
FIG. 9 is a cross-sectional view showing a plastic bonding step of the hub wheel and the outer joint member.

As shown in FIG. 9, a slip-out prevention effect of the hub wheel 10 is further enhanced by caulking an outer peripheral portion (shown by broken line) of the solid shaft end of the stem portion 31b with a caulking tool 59 after the press fitting to form a flange 58. When sufficient connection strength can be obtained simply by press fitting, the caulking step may be eliminated.

In such a connection structure, heat treatment is desirably performed in advance on the male part 51 having the non-perfect circle shape in cross-section so that a surface layer H has a higher hardness than that of the female part 52 as shown in FIG. 9. Deformation of the male part 51 due to press fitting is thereby suppressed, and the male part 51 can be easily inserted to the female part 52, whereby the connection strength can be further enhanced. In a case of performing caulking processing shown in FIG. 9, the shaft end portion of the stem portion 31b to be plastically deformed by caulking is unquenched, so that the flange 58 can be easily formed. The heat treatment method for the male part 51 is desirably a high frequency quenching in which a quenching range and a quenching depth can be easily controlled. The female part 52 is basically a raw material that is not subjected to heat treatment, but may be subjected to heat treatment as long as the surface hardness thereof does not exceed that of the male part 51.

The above description exemplifies the case where the male part 51 is formed into the non-perfect circle shape in cross-section and the female part 52 is formed into the perfect circle shape in cross-section. Alternatively, the male part 51 may be formed into a perfect circle shape in cross-section and the female part 52 may be formed into a non-perfect circle shape in cross-section in a case where no problem particularly arises in terms of cost and the like. The female part 52 having the non-perfect circle shape in cross-section may be formed through broach processing. In this case, the female part 52 having the non-perfect circle shape in cross-section is formed to have a hardness higher than that of the male part 51 having the perfect circle shape in cross-section.

When the male part 51 is press fit to the female part 52, the hub wheel 10 is slightly deformed in the diameter expanding direction, the influence of which may extend to the inner races 21. As shown in FIG. 9, such an event can be avoided by arranging the press fit portion between the male part 51 and the female part 52 on the axial center line O of the rolling elements 23 on the inboard side and the outboard side.

As shown in FIG. 1, after assembling the drive shaft assembly to the vehicle body, the brake rotor 70 and the wheel 80 are assembled with each other to thereby configure a wheel supporting device. The brake rotor 70 is arranged between the outboard side end face of the wheel attachment flange 11 and the wheel 80, and the end face thereof is closely attached to the outboard side end face of the wheel attachment flange 11.

The brake rotor 70 is formed with holes 71 used for inserting a wheel bolt at a plurality of locations in the circumferential direction, and a cylindrical pilot portion 72 that is fitted to the inner peripheral surface of the wheel 80 is formed at the inner diameter end thereof.

As described above, the shape on the outboard side of the hub wheel 10 can be simplified, in comparison to the conventional art, by forming the pilot portion 72 on the brake rotor 70. Thus, manufacturing of the hub wheel 10 can be carried out with a low cost processing method such as cold forging, and the hub wheel 10 does not have the pilot portion, whereby rust prevention processing on the hub wheel 10 is unnecessary. Therefore, cost of the hub wheel 10 can be lowered. The hub wheel 10 can be manufactured only by cold forging, but may be manufactured by partially performing turning processing, as necessary.

The brake rotor 70 is normally manufactured by a casting method, and thus increase in manufacturing cost can be suppressed to a minimum even when the shape of the brake rotor 70 is complicated due to arrangement of the pilot portion 72.

Figure 2:
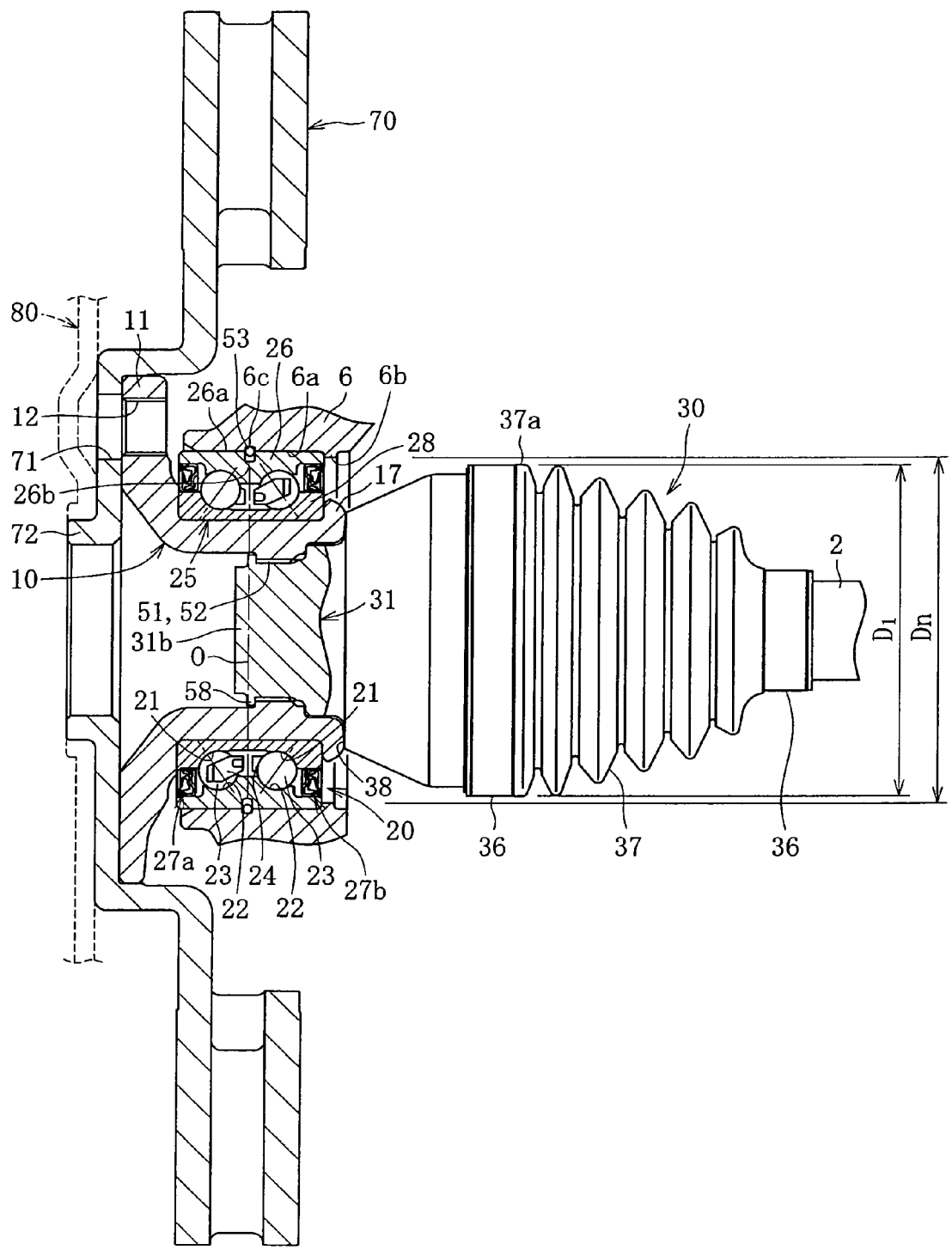
FIG. 2 is a cross-sectional view of a bearing unit for wheel according to a second embodiment.
Figure 3:
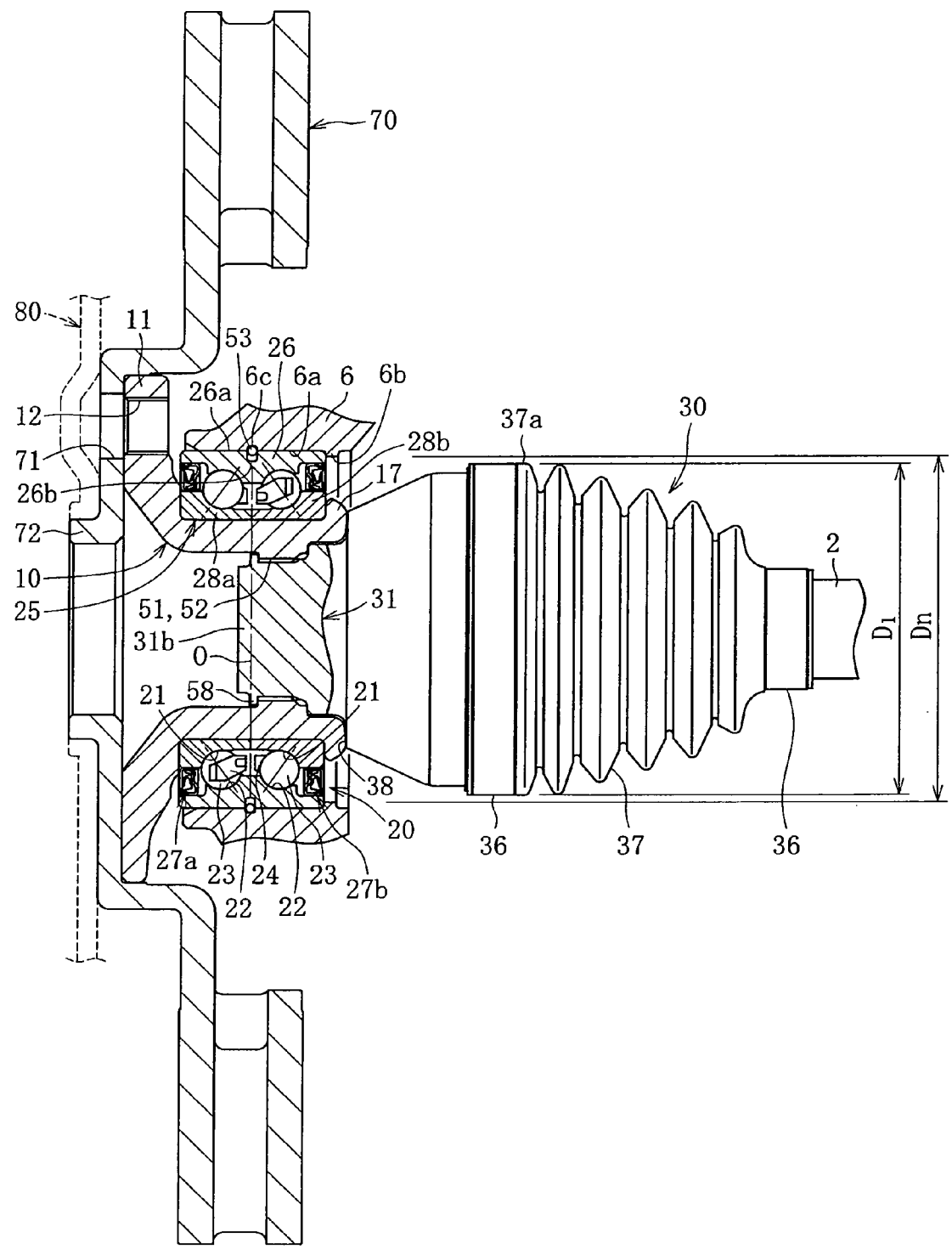
FIG. 3 is a cross-sectional view of a bearing unit for wheel according to a third embodiment.

FIG. 2 and FIG. 3 show a second and a third embodiments of the bearing unit for wheel, respectively. In the second embodiment shown in FIG. 2, the double row inner races 21 of the bearing unit 20 are all formed on the outer peripheral surface of the inner ring 28 that has an integrated structure by being press fit to the outer periphery of the hub wheel 10. In this case, the inner ring 28 configures the inner member 25 having the double row inner races 21. The third embodiment shown in FIG. 3 is an example where the inner ring 28 having an integrated structure shown in FIG. 2 is divided in half in the axial direction, each of which is press fit to the outer peripheral surface of the hub wheel 10, and the inner races 21 are formed respectively on the outer peripheral surfaces of the two inner rings 28a, 28b. In this embodiment, the two inner rings 28a, 28b configure the inner member 25 having the double row inner races 21. Other configurations are common with those in the first embodiment shown in FIG. 1, and thus common reference numbers are denoted for common members/elements, and redundant description will not be provided.

Figure 12:
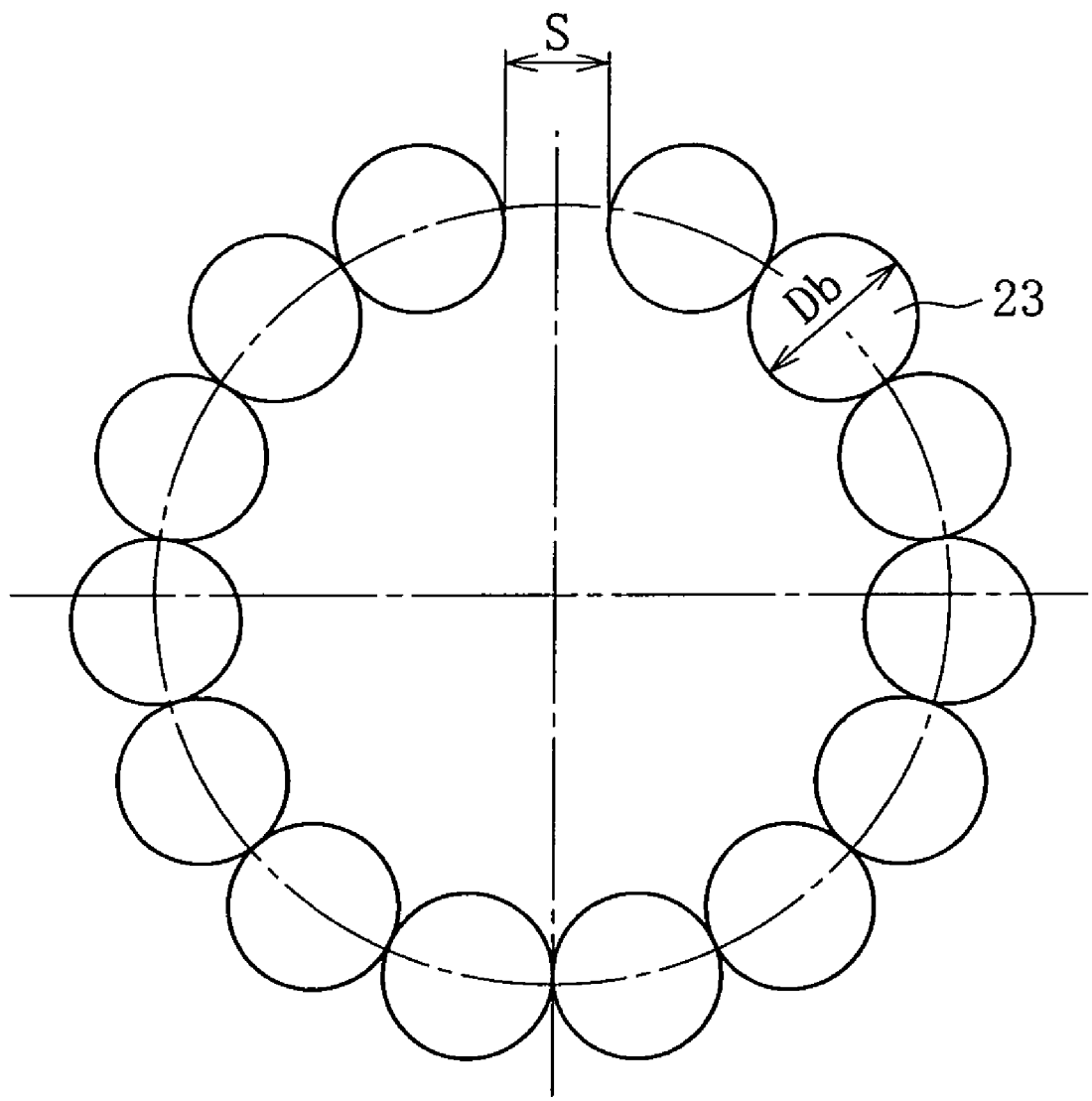
FIG. 12 is a front view showing a bearing structure of a total-rolling element type.

In each of the above embodiments, exemplified is the bearing unit 20 having the rolling elements 23 held by the cage 24, but a total-rolling element type that does not use the cage as shown in FIG. 12 may be adopted for the bearing unit 20. In the case of the total-rolling element type, the number of rolling elements that can be incorporated increases in comparison to the case of using the cage 24, and thus the load of each of the rolling elements can be reduced. Therefore, the lifespan of the bearing unit can be enhanced even under a highly loaded condition. The total-rolling element type may be used only on the highly loaded side when there is a difference in load between the rolling element row on the inboard side and the rolling element row on the outboard side. Obviously, when both the rolling element rows are under the similar load conditions, the total-rolling element type may be adopted to the both. Normally, the total-rolling element type is adopted to the rolling element row on the inboard side since the moment load on the inboard side is large.

In the case of the total-rolling element type, the rolling elements may intensively hit with each other to generate a slapping sound or heat when the clearance in the circumferential direction between the rolling elements is too large. Thus, a total clearance S between the rolling elements is desirably made smaller than a diameter dimension Db of the rolling elements 23 (particularly when using a ball as the rolling element 23, the total clearance S is set smaller than or equal to about 40% of the diameter of the ball).

Figure 13:
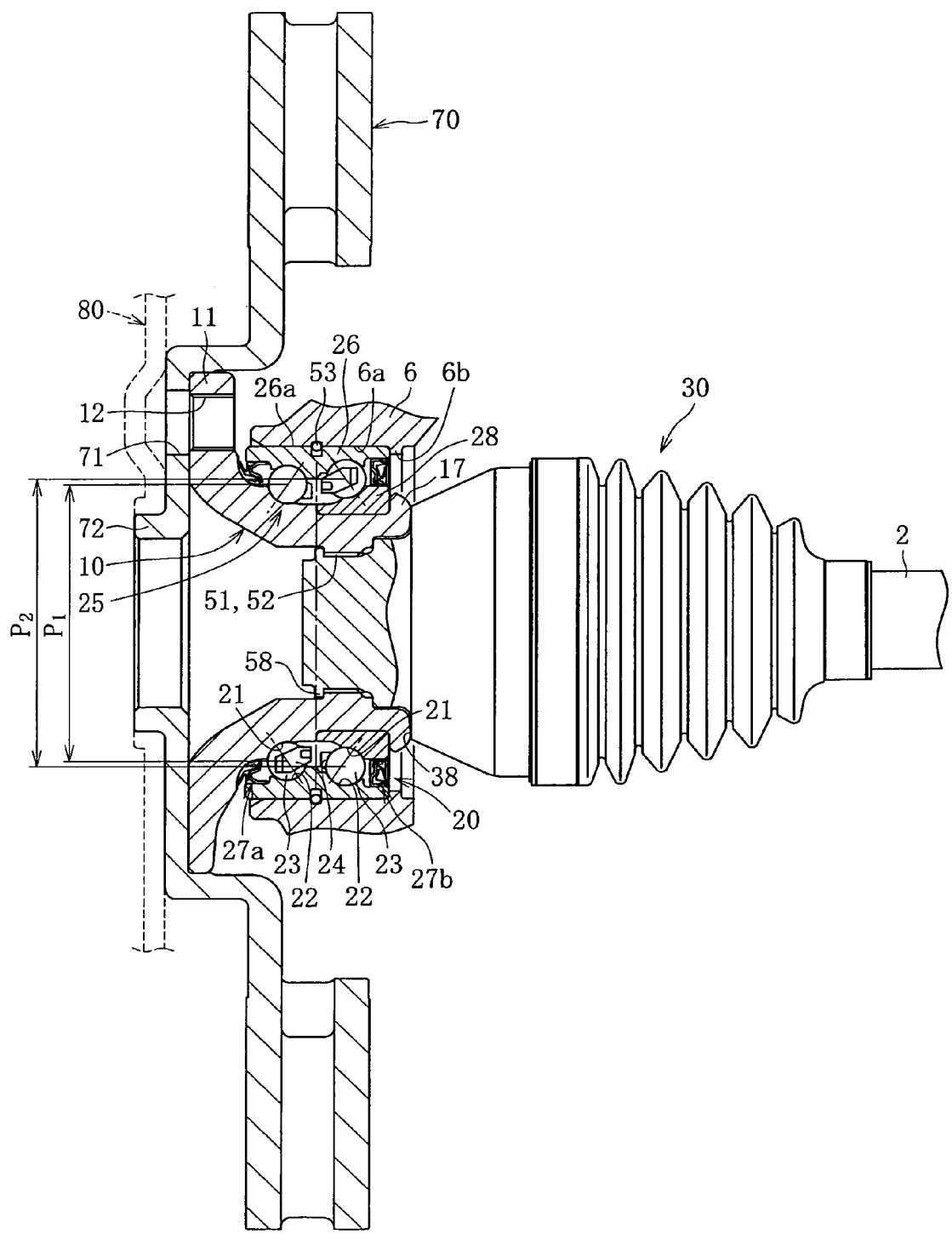
FIG. 13 is a cross-sectional view of a bearing unit for wheel according to a fourth embodiment.
Figure 14:
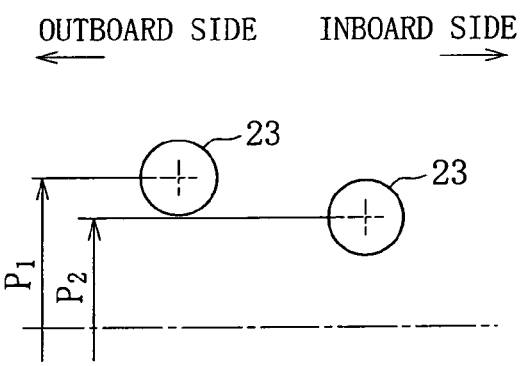
FIG. 14 is a side view schematically showing rolling elements having different PCDs.
Figure 15A:
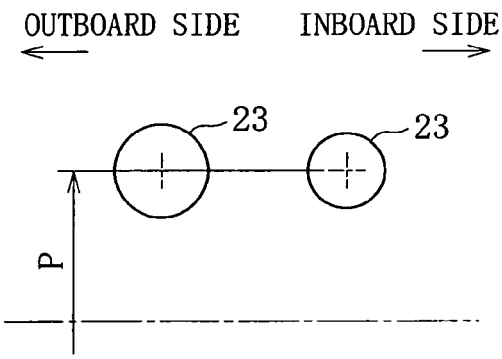
FIG. 15a is a side view schematically showing rolling elements of different diameters.
Figure 15B:
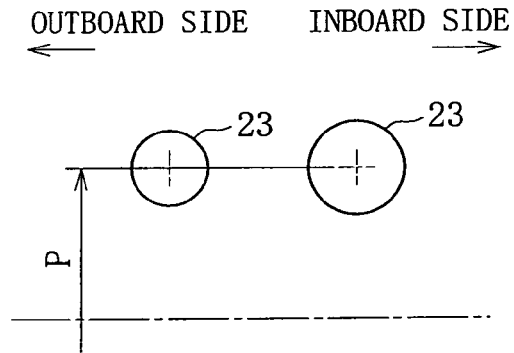
FIG. 15b is a side view schematically showing rolling elements of different diameters.

FIG. 13 shows a fourth embodiment of the present invention. In this embodiment, a difference is provided between a PCD (P1) of the rolling element row on the outboard side and a PCD (P2) of the rolling element row on the inboard side, where effects of higher rigidity and longer lifespan can be expected. This is due to reasons that, when one of the PCDs is set large, a bearing span (a distance between intersections between a line of action in the acting direction of the force applied on both the race surfaces and the axial center) can be increased without increasing the axial dimension of the bearing unit, the number of rolling elements that can be incorporated is increased, and the like. FIG. 13 exemplifies a case where the PCD (P2) of the rolling element row on the inboard side is set large. Alternatively, the PCD (P1) of the rolling element row on the outboard side may be set large, as shown in FIG. 14. Similar effects can be obtained even by incorporating a greater number of rolling elements on the cage 24 on one side in comparison to the other side by providing different designs for the cage 24 on the inboard side and the cage 24 on the outboard side. Furthermore, similar effects can be obtained by differing the diameter of the rolling element 23 on the inboard side and the diameter of the rolling element 23 on the outboard side, as shown in FIGS. 15(a), (b).

Figure 18:
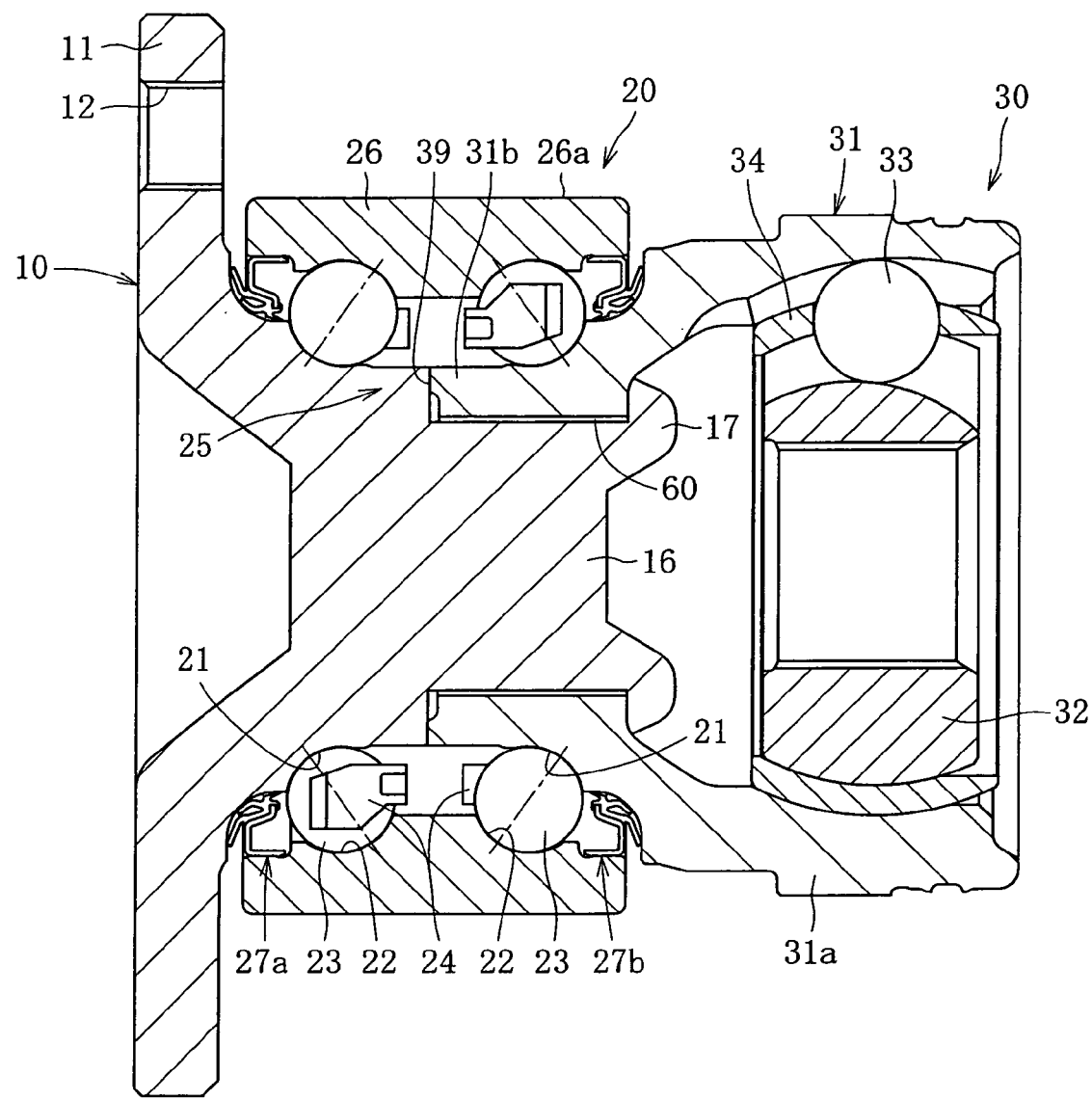
FIG. 18 is a cross-sectional view of a bearing unit for wheel according to a seventh embodiment.
Figure 19:
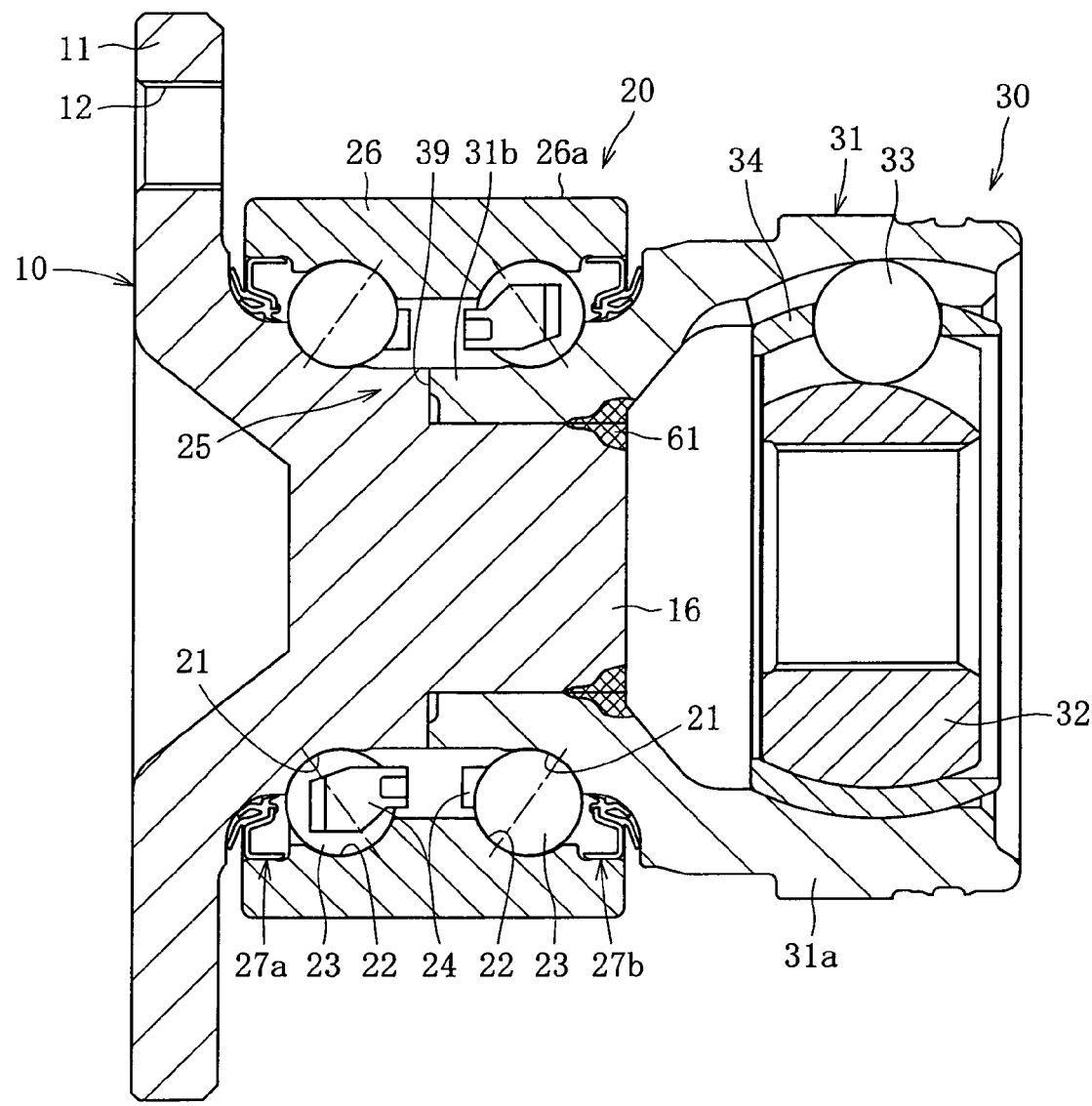
FIG. 19 is a cross-sectional view of a bearing unit for wheel according to an eighth embodiment.
Figure 20:
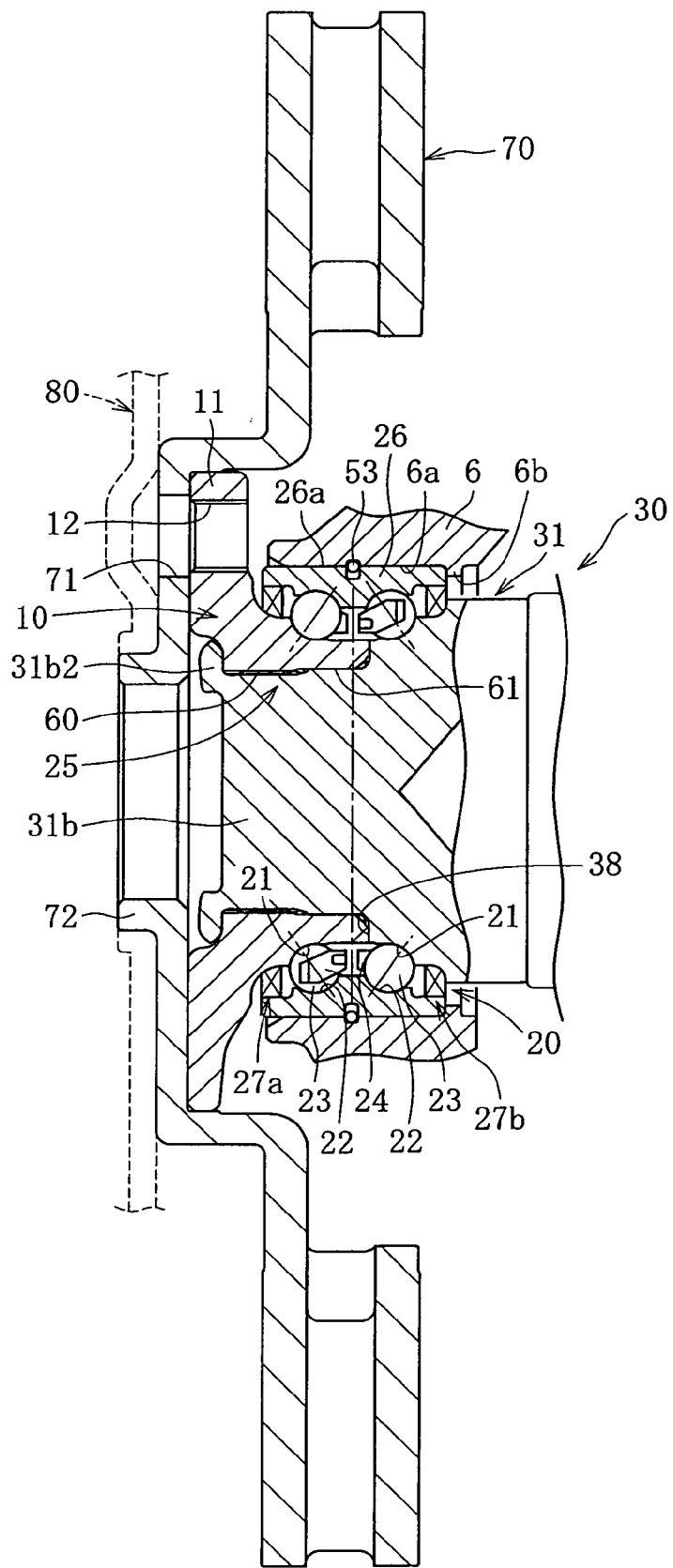
FIG. 20 is a cross-sectional view of a bearing unit for wheel according to a ninth embodiment.

As shown in FIG. 16 to FIG. 20, a type in which the inner race 21 on the outboard side is formed on the outer peripheral surface of the hub wheel 10, and the inner race 21 on the inboard side is formed on the outer peripheral surface of the outer joint member 31 may be used as the drive bearing unit for wheel. FIG. 16 to FIG. 19 show examples of fitting the hub wheel 10 to the inner periphery of the hollow stem portion 31b to connect in an inseparable manner, and FIG. 20 shows an example of fitting the stem portion 31b to the inner periphery of the hollow hub wheel 10 to connect in an inseparable manner. In either of the bearing units, the dimension between the double row inner races 21 is defined and the preliminary pre-load is applied to the bearing unit 20 by contacting the shoulder surface 38 of the outer joint member 31 and the outboard side end face 39 to the hub wheel 10 in the axial direction. The hub wheel 10 and the outer joint member 31 configure the inner member 25 having the double row inner races 21. The configuration of each of the bearing units will be specifically described below.

Figure 16:
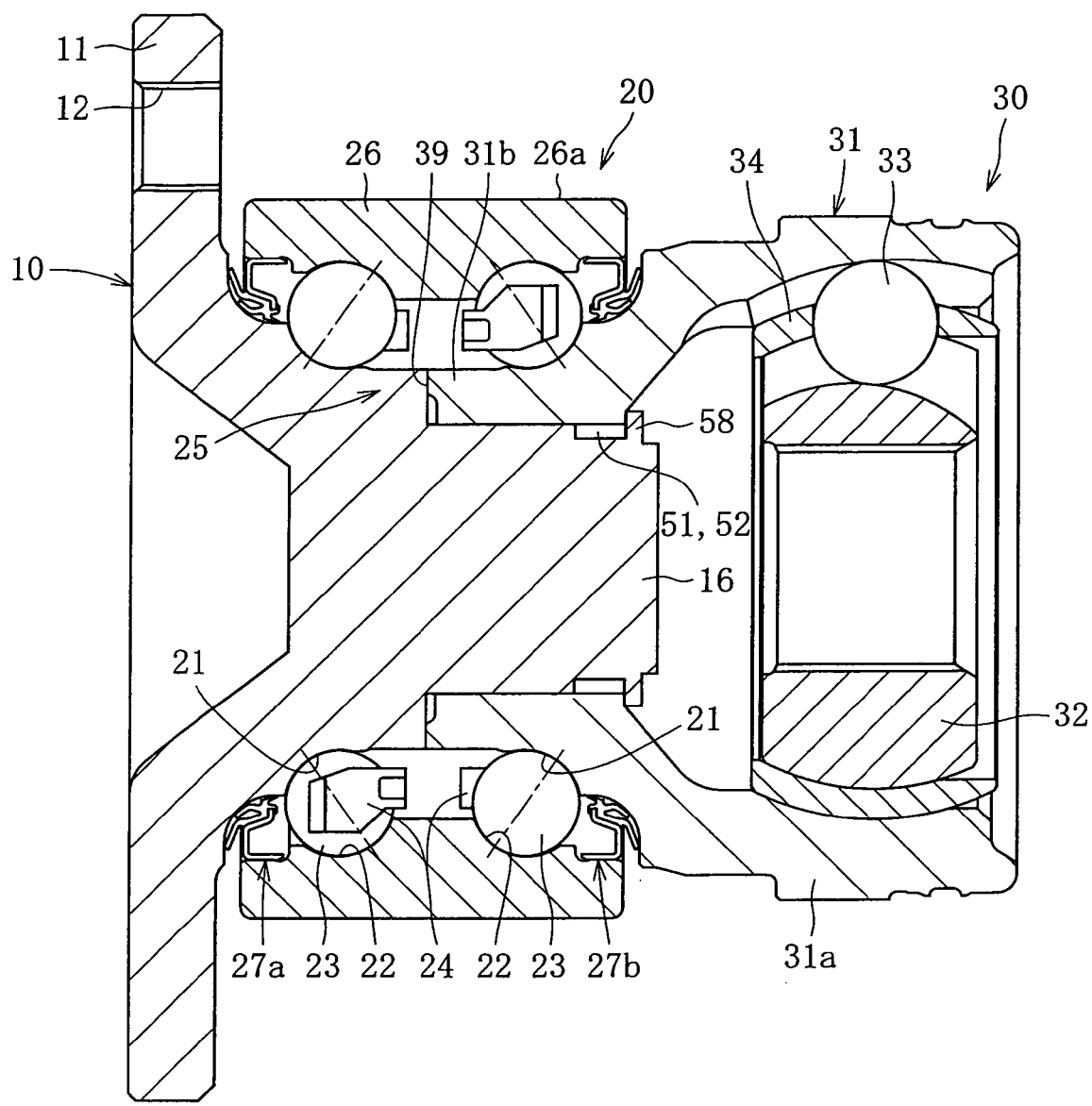
FIG. 16 is a cross-sectional view of a bearing unit for wheel according to a fifth embodiment.

FIG. 16 shows a fifth embodiment of the bearing unit for wheel. In this embodiment, the male part 51 and the female part 52 are formed into shapes different from each other, and the male part 51 is press fit to the female part 52 so as to plastically bond the hub wheel 10 and the outer joint member 31, similarly to the first embodiment shown in FIG. 1. In this case, the male part 51 is formed on the outer peripheral surface of a solid end 16 on the inboard side, and the female part 52 is formed on the inner peripheral surface of the stem portion 31b facing therewith in the hub wheel 10. Similarly to the first embodiment, connection strength can be further enhanced by caulking the outer peripheral part of the solid shaft end 16 of the hub wheel 10 and forming the flange 58 according to the method shown in FIG. 9 after press fitting the female part 52.

Figure 17:
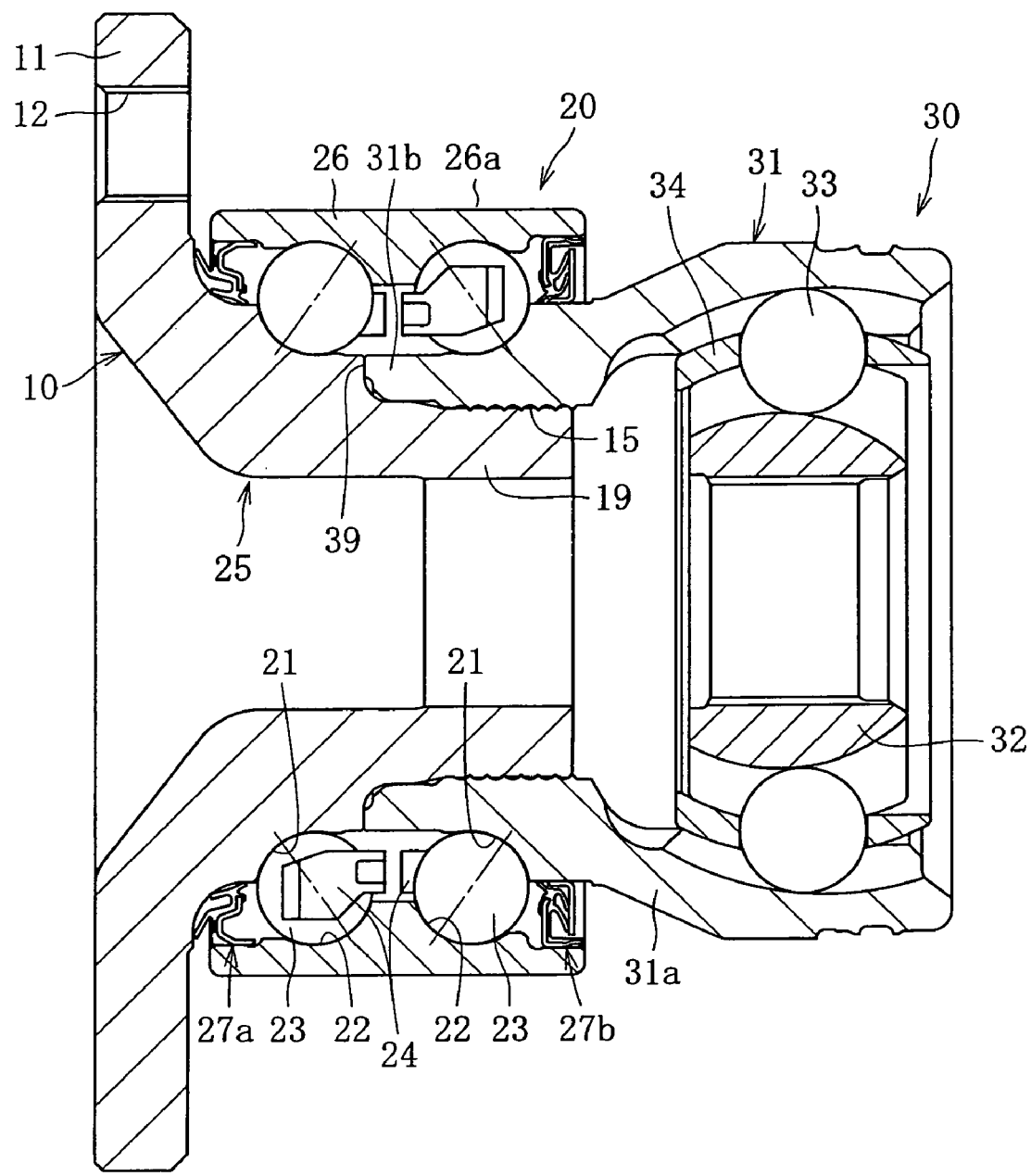
FIG. 17 is a cross-sectional view of a bearing unit for wheel according to a sixth embodiment.

FIG. 17 shows a sixth embodiment of the bearing unit for wheel, and shows an example where the hub wheel 10 and the outer joint member 31 are caulked in a diameter expanding manner and plastically bonded. In this embodiment, there is formed at the end on the inboard side of the hub wheel 10 a small diameter part 19 of which inner diameter dimension is made smaller than other locations. After inserting the hub wheel 10 to the inner periphery of the stem portion 31b, a mandrel having a diameter larger than the inner diameter of the small diameter part 19 is pushed into the inner periphery of the hub wheel 10 to expand the diameter of the small diameter part 19 and be pressure welded to the inner peripheral surface of the stem portion 31b, so that the hub wheel 10 and the outer joint member 31 are plastically bonded. Bumps 15 are formed in advance through knurling processing or the like on the inner peripheral surface of the stem portion 31b, and the bumps 15 are hardened by heat treatment, so that the bumps 15 can be reliably engaged with the outer peripheral surface of the hub wheel 10 due to diameter expansion of the small diameter part 19, and the hub wheel 10 and the outer joint member 31 can be firmly plastically bonded.

FIG. 18 shows a seventh embodiment of the bearing unit for wheel in which the hub wheel 10 and the outer joint member 31 are inseparably connected with each other through orbital forming. In the orbital forming, the shaft end on the inboard side of the hub wheel 10 is formed into a cylindrical shape, and the cylindrical part is plastically deformed to the outer diameter side through oscillation of the forming tool so as to form the flange 17. Slip-out prevention of the outer joint member 31 is performed by bringing the flange 17 into contact with the end face of the outer joint member 31, and hub wheel 10 and the outer joint member 31 are prevented from rotating by forming a spline 60 between the outer peripheral surface of the hub wheel 10 and the inner peripheral surface of the stem portion 31b.

FIG. 19 shows an eighth embodiment of the present invention in which the hub wheel 10 and the outer joint member 31 are inseparably connected by welding (a welded portion is indicated with symbol 61). The welding method may be selected from laser beam welding, plasma welding, electron beam welding, projection welding by high-speed pulse method, and the like. The hub wheel 10 is press fit to the inner periphery of the stem portion 31b, and torque can be transmitted via the press fit fit-in surface, and thus load applied on the welded portion 61 is small and the welding method with small heat influence can be adopted as described above.

FIG. 20 shows a ninth embodiment of the present invention, and shows an example in which the hub wheel 10 and the outer joint member 31 are inseparably connected through orbital forming, similarly to the seventh embodiment shown in FIG. 18. Differences from the embodiment shown in FIG. 18 found in that the stem portion 31b is fitted to the inner periphery of the hollow hub wheel 10, and in that orbital forming is performed on the shaft end on the outboard side of the stem portion 31b.

Figure 21:
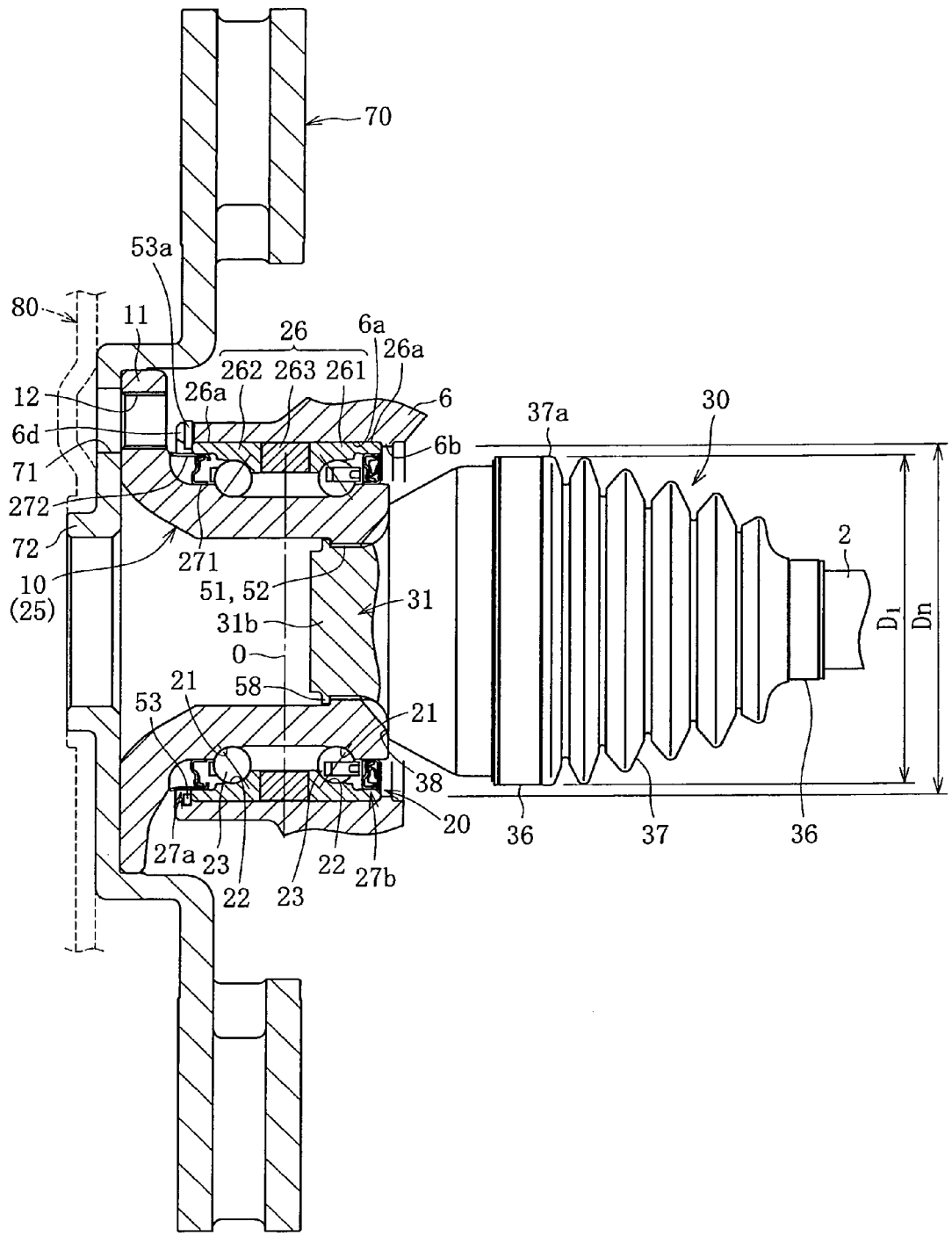
FIG. 21 is a cross-sectional view of a bearing unit for wheel according to a tenth embodiment.

FIG. 21 shows a tenth embodiment of the bearing unit for wheel.

In this bearing unit, the outer member 26 is configured by a pair of outer rings 261, 262, and a ring-shaped spacer 263 arranged between the outer rings 261, 262. The outer race 22 is formed on each of the inner peripheral surfaces of the outer rings 261, 262. The double row inner races 21 are formed directly on the outer peripheral surface of the hub wheel 10, whereby the hub wheel 10 configures the inner member 25. In the drawing, the end face on the inboard side of the hub wheel 10 is brought into contact with the shoulder surface 38 of the outer joint member 31. Alternatively, a clearance may be interposed therebetween in a case where sufficient connection strength is ensured between the hub wheel 10 and the outer joint member 31.

Out of the seals 27a, 27b for sealing the openings at the both ends of the bearing unit 20, the seal 27a on the outboard side is configured by a core metal 271 having an outer diameter end covered with an elastic material such as rubber and formed with a plurality of (e.g., two) seal lips, and a slinger 272 that contacts the seal lips. The core metal 271 is press fitted and fixed to the outer peripheral surface of the hub wheel 10, and the slinger 272 is press fitted and fixed to the inner peripheral surface of the outer ring 262 on the outboard side. The end on the outboard side of the slinger 272 is proximate to the inboard side end face of the flange 11, and configures a labyrinth seal.

Figure 23:
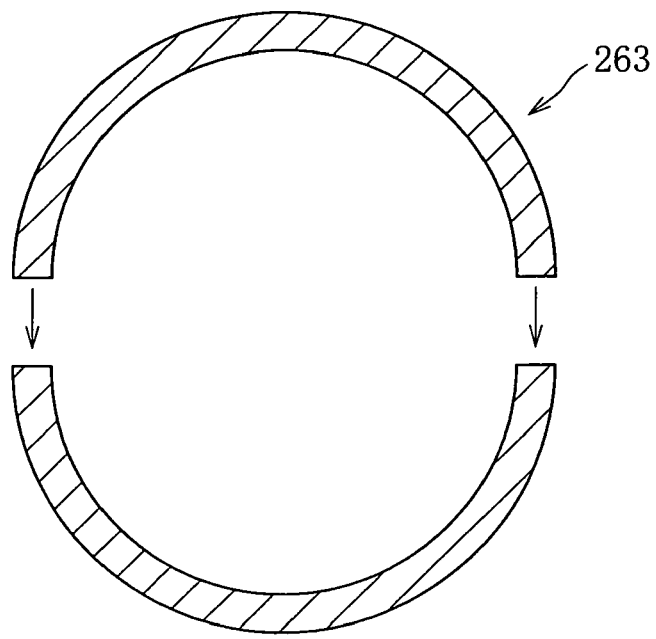
FIG. 23 is a cross-sectional view of a spacer.

The outer peripheral surfaces of the outer rings 261, 262 and the spacer 263 all have cylindrical surfaces. The outer peripheral surfaces 26a of the outer ring 261, 262 are press fit to the inner peripheral surface 6a of the knuckle member 6, but the outer diameter dimension of the spacer 263 is slightly smaller than the outer diameter dimension of the outer rings 261, 262 and there is formed a slight clearance between the spacer 263 and the inner peripheral surface of the knuckle member 6. The spacer 263 is divided in half in the circumferential direction, as shown in FIG. 23.

Figure 22:
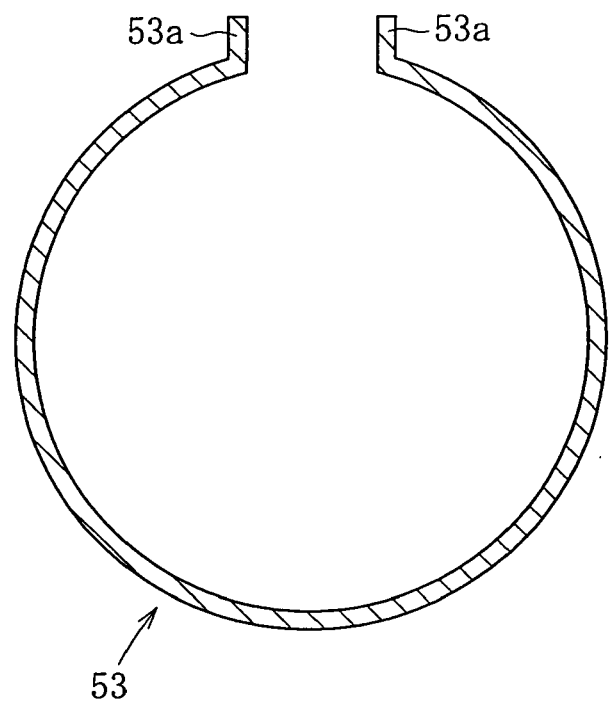
FIG. 22 is a cross-sectional view of a snap ring.

The outer ring 262 on the outboard side is positioned by the snap ring 53 that is arranged on the outboard side with respect to the axial center line O between the rolling element 23 on the inboard side and the rolling element 23 on the outboard side. As shown in FIG. 22, a C-type having an operation portion 53a extending to the outer diameter side at both ends in the circumferential direction can be used as the snap ring 53. The snap ring 53 is fitted to the snap ring groove formed on the inner peripheral surface of the knuckle member 6, and the operation portion 53a is accommodated in an axial cutout 6d formed in the knuckle member 6, so that the snap ring 53 is engaged with the outboard side end face of the outer ring 262 so as to position the outer member 26.

The bearing unit is assembled through the following procedures.

Figure 24:
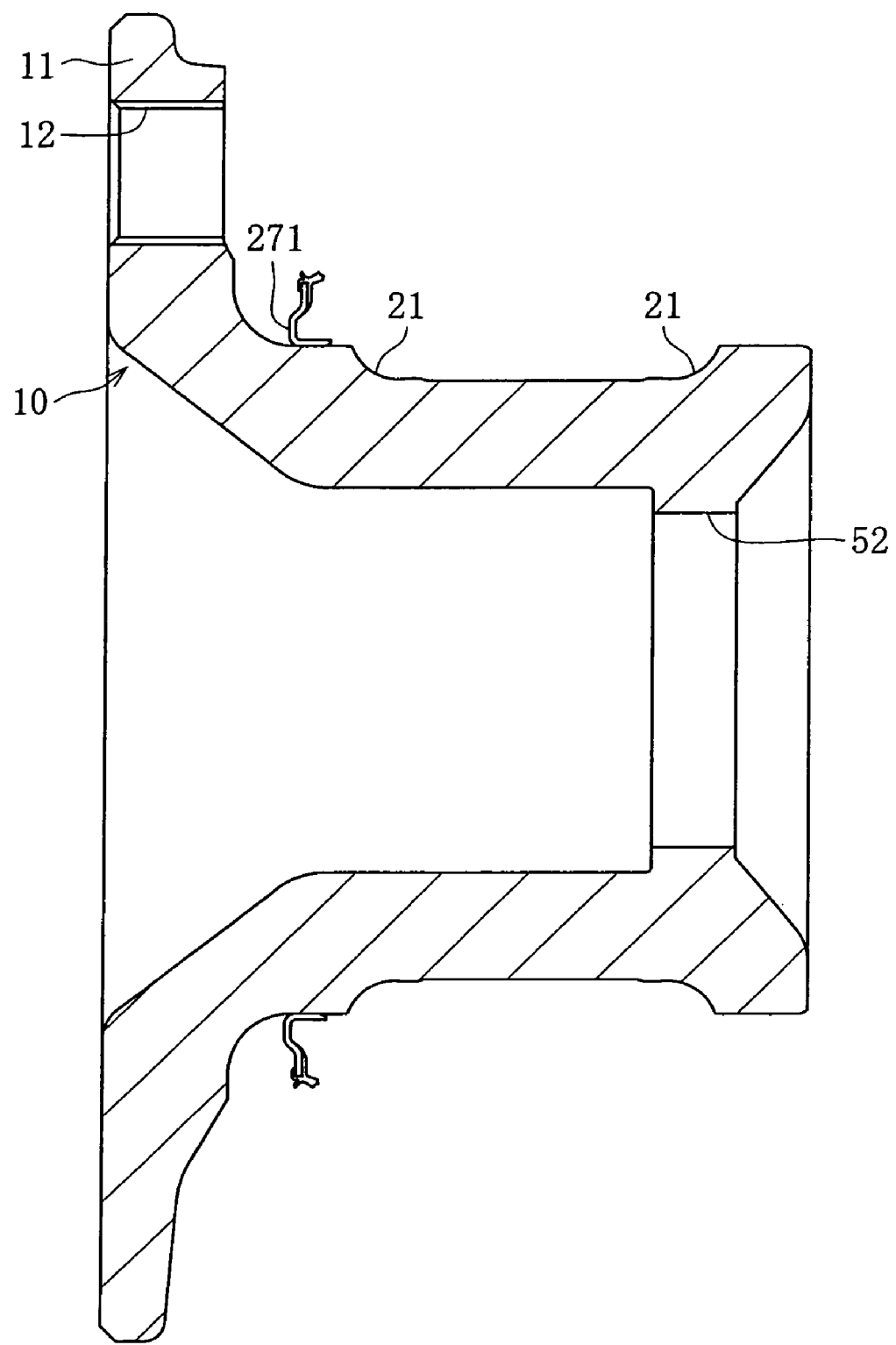
FIG. 24 is a cross-sectional view showing an assembly step of the bearing unit for wheel.

First, as shown in FIG. 24, the core metal 271 of the seal 27a on the outboard side is press fitted and fixed to the outer periphery of the hub wheel 10.

Figure 25:
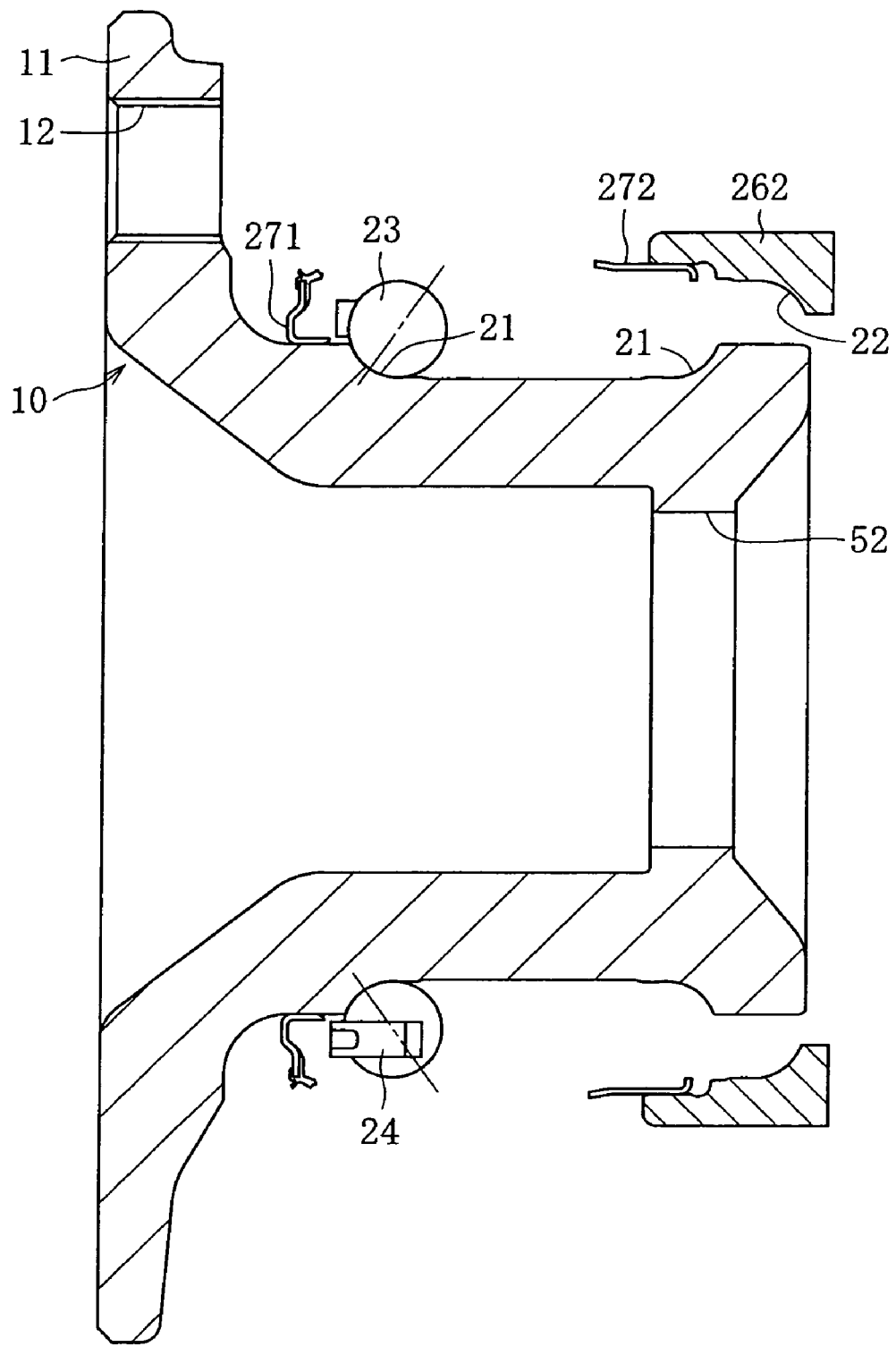
FIG. 25 is a cross-sectional view showing the assembly step of the bearing unit for wheel.

Then, as shown in FIG. 25, the rolling element 23 is incorporated in the outer periphery of the hub wheel 10 and accommodated in the inner race 21. The rolling element 23 is incorporated in the outer periphery of the hub wheel 10 while being accommodated in a pocket of the cage 24 in advance. The outer ring 262 on the outboard side is then inserted to the outer periphery of the hub wheel 10. At this stage, the slinger 272 is press fit to the inner peripheral surface of the outer ring 262 in advance. As the outer ring 262 is pushed towards the outboard side, the seal lips formed on the core metal 271 contact the inner peripheral surface of the slinger 272, thereby configuring the seal 27a. The rolling element 23 is accommodated in the outer race 22 of the outer ring 262.

Figure 26:
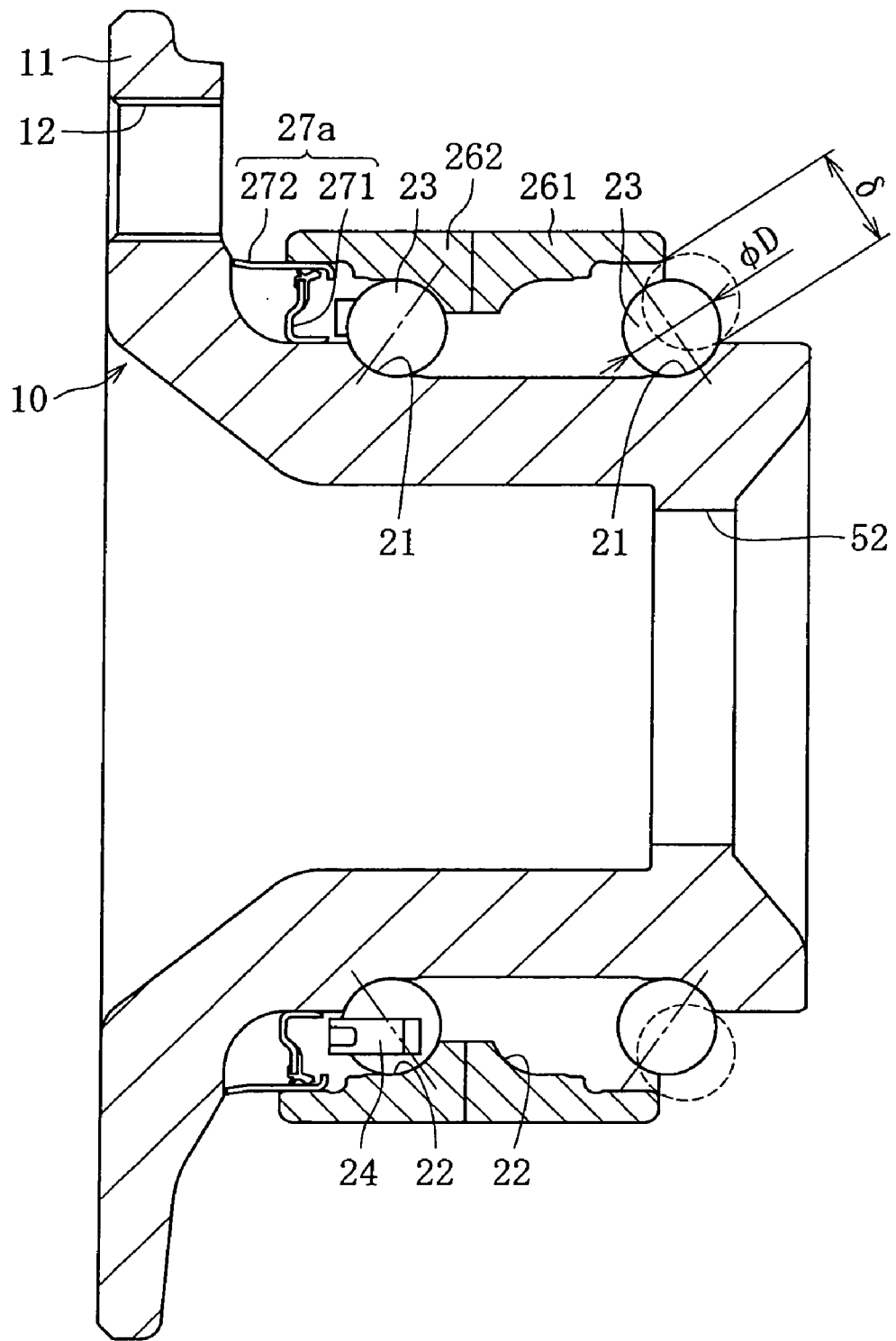
FIG. 26 is a cross-sectional view showing the assembly step of the bearing unit for wheel.

As shown in FIG. 26, the outer ring 261 on the inboard side is inserted to the outer periphery of the hub wheel 10. A clearance δ larger than the ball diameter D is formed between the inboard side end of the outer ring 261 and the hub wheel 10 by positioning the outer ring 261 on the outboard side with respect to a defined position due to such as contact with the outer ring 262 on the outboard side, so that the rolling element 23 is inserted to a space between the outer ring 261 and the hub wheel 10 through the clearance δ. After inserting the defined number of rolling elements 23, the cage 24 is pushed into the opening on the inboard side so as to accommodate the rolling elements 23 in the pockets, thereby holding the rolling elements 23 at equal intervals in the circumferential direction.

Figure 27:
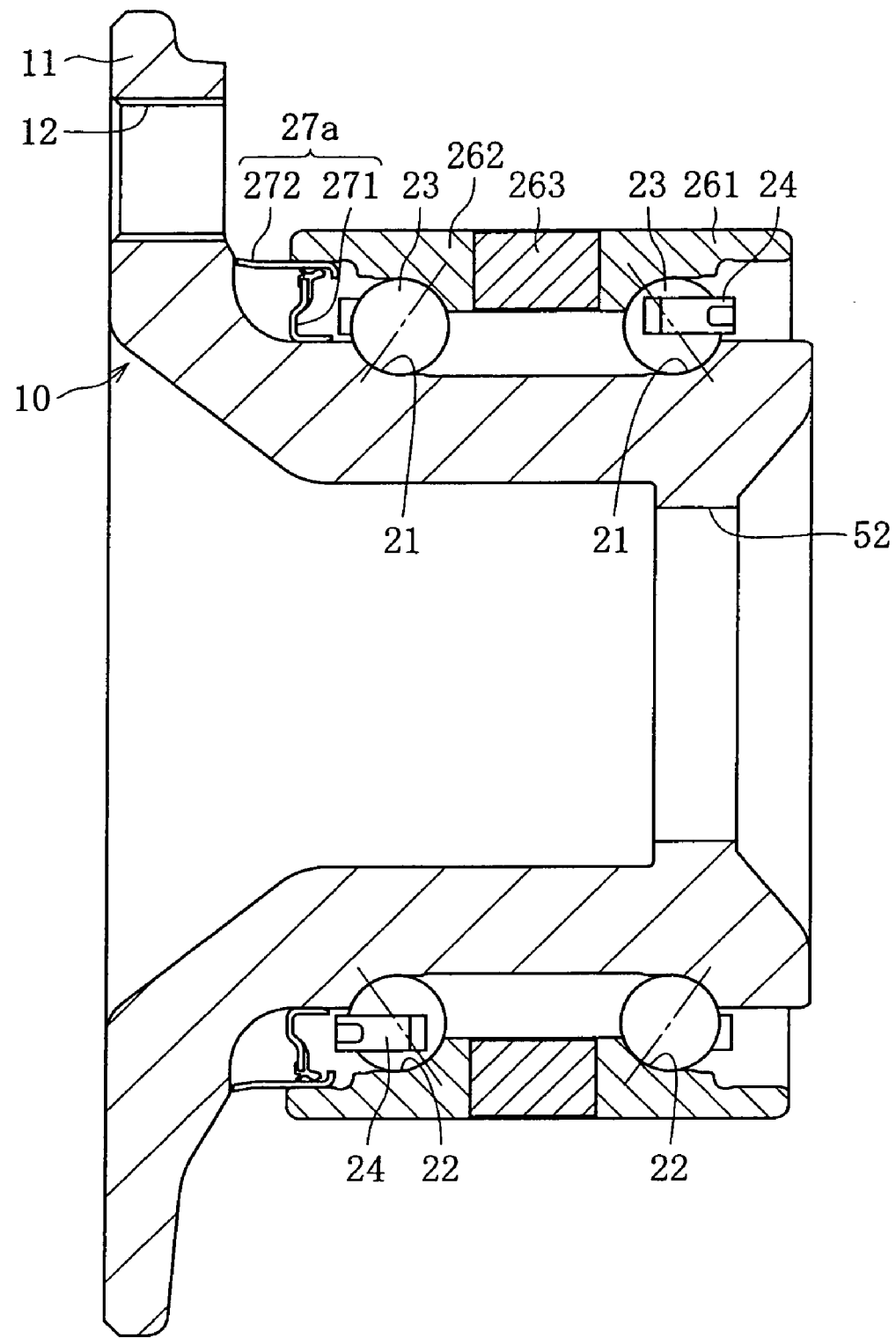
FIG. 27 is a cross-sectional view showing the assembly step of the bearing unit for wheel.

As shown in FIG. 27, a clearance is formed between the outer rings 261, 262, and the dividing spacer 263 is inserted to place the hub wheel 10 in the clearance. The outer ring 261 on the inboard side is then arranged at a defined position, and the rolling element 23 on the inboard side is accommodated at a predetermined contact angle in the inner race 21 and the outer race 22.

Figure 28:
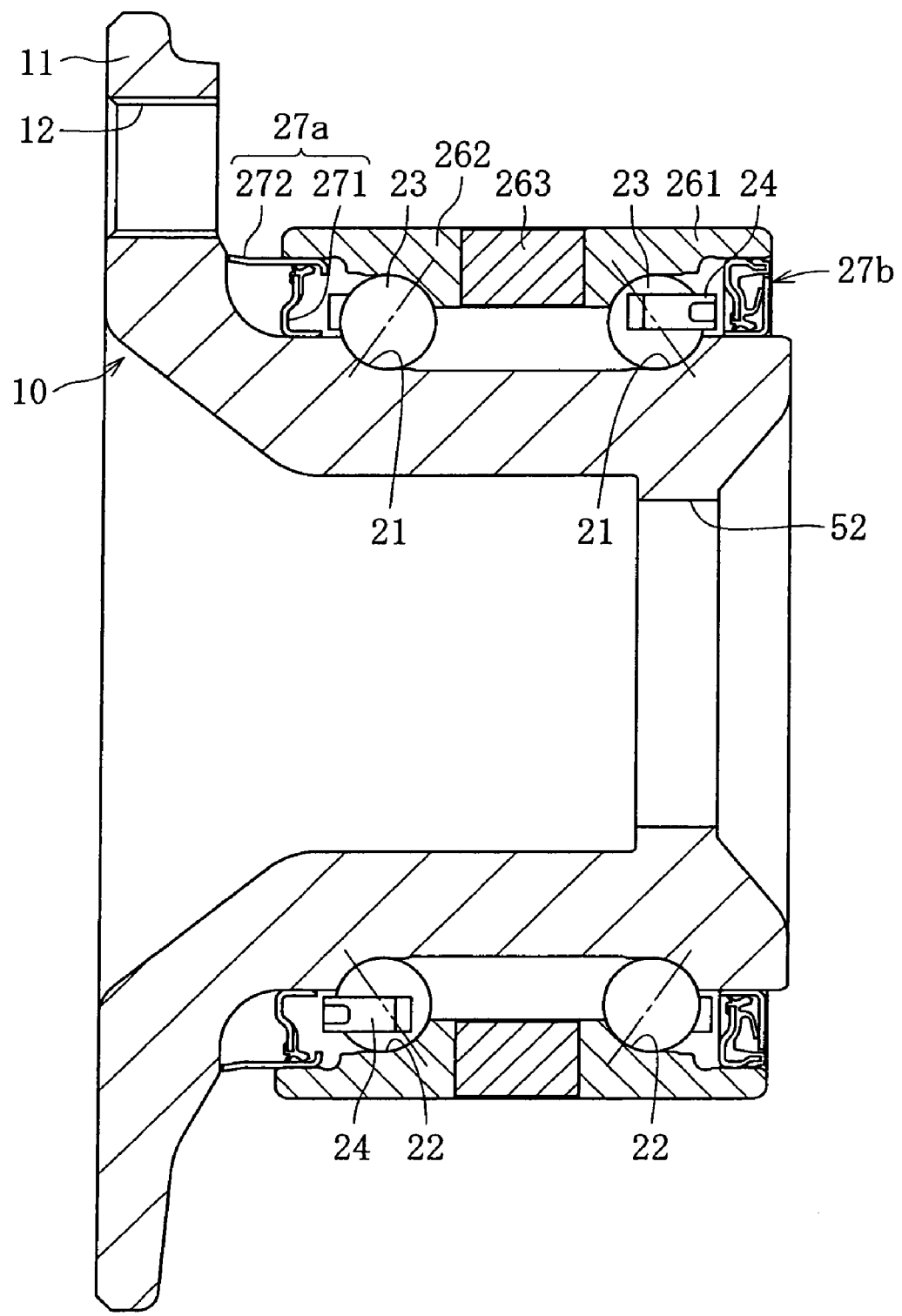
FIG. 28 is a cross-sectional view showing the assembly step of the bearing unit for wheel.

Thereafter, the cassette seal is press fit to the opening between the outer ring 261 on the inboard side and the hub wheel 10, thereby configuring the seal 27b, as shown in FIG. 28.

After the above assembling is completed, the hub wheel 10 is inseparably connected with the outer joint member 31 of the outboard side constant velocity universal joint 30. The connection method in this case is arbitrarily selected, in which the male part 51 may be press fit to the female part 52 for plastic bonding, similarly to the embodiment shown in FIG. 1, or, connection may be carried out through means such as diameter expansion caulking, orbital forming, and welding. The inboard side constant velocity universal joint 40, the intermediate shaft 2, and the outboard side constant velocity universal joint 30 are then inserted in this order to the inner periphery of the knuckle member 6, and finally, the outer member 26 is press fit while diameter expanding the snap ring 53, and the outer ring 261 on the inboard side is brought into contact with the projection 6b. The snap ring 53 is thereafter elastically reduced in diameter to be engaged with the outboard side end face of the outer ring 262, whereby the assembling of the drive shaft assembly is completed.

According to the above configuration, the spacer 263 that can be inserted afterwards is arranged between the pair of outer rings 261, 262, and thus the double row of rolling elements 23 can be incorporated in the space between the outer member 26 and the hub wheel 10 even in a case where the inner races 21 are formed directly in the hub wheel 10. Therefore, the inner rings 28, 28a, 28b are unnecessary in each of the embodiments shown in FIG. 1 to FIG. 3, and cost can be reduced due to reduction in the number of parts.

When problems do not particularly arise in incorporation, a type in which the seal lips are arranged at the inner diameter end of the core metal, and the outer peripheral surface of the core metal is press fit to the inner peripheral surface of the outer member 26 may be used as the seal 27a on the outboard side, similarly to the seal 27a shown in FIG. 1.

Figure 29:
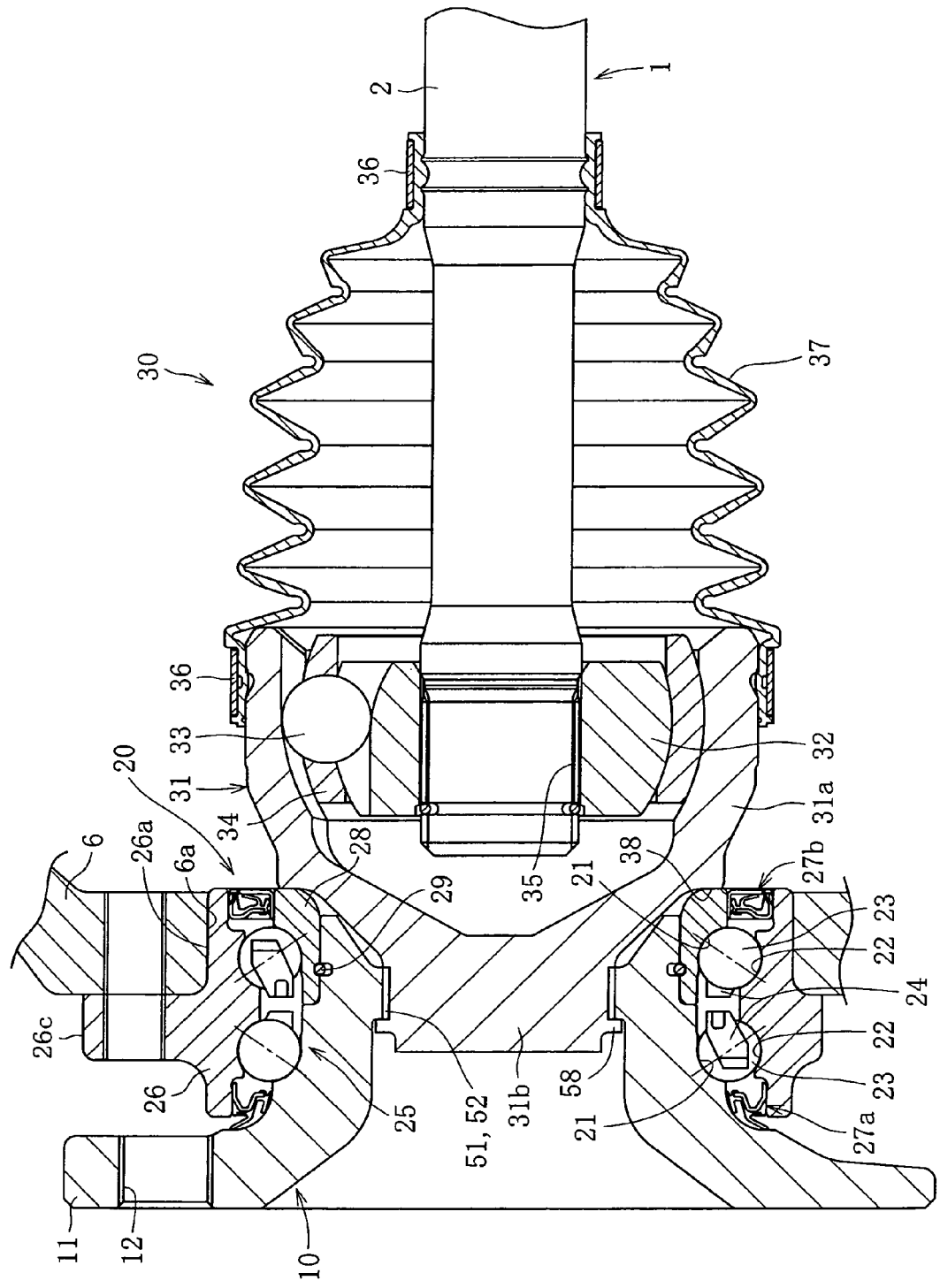
FIG. 29 is a cross-sectional view of a bearing unit for wheel according to an eleventh embodiment.
Figure 30:
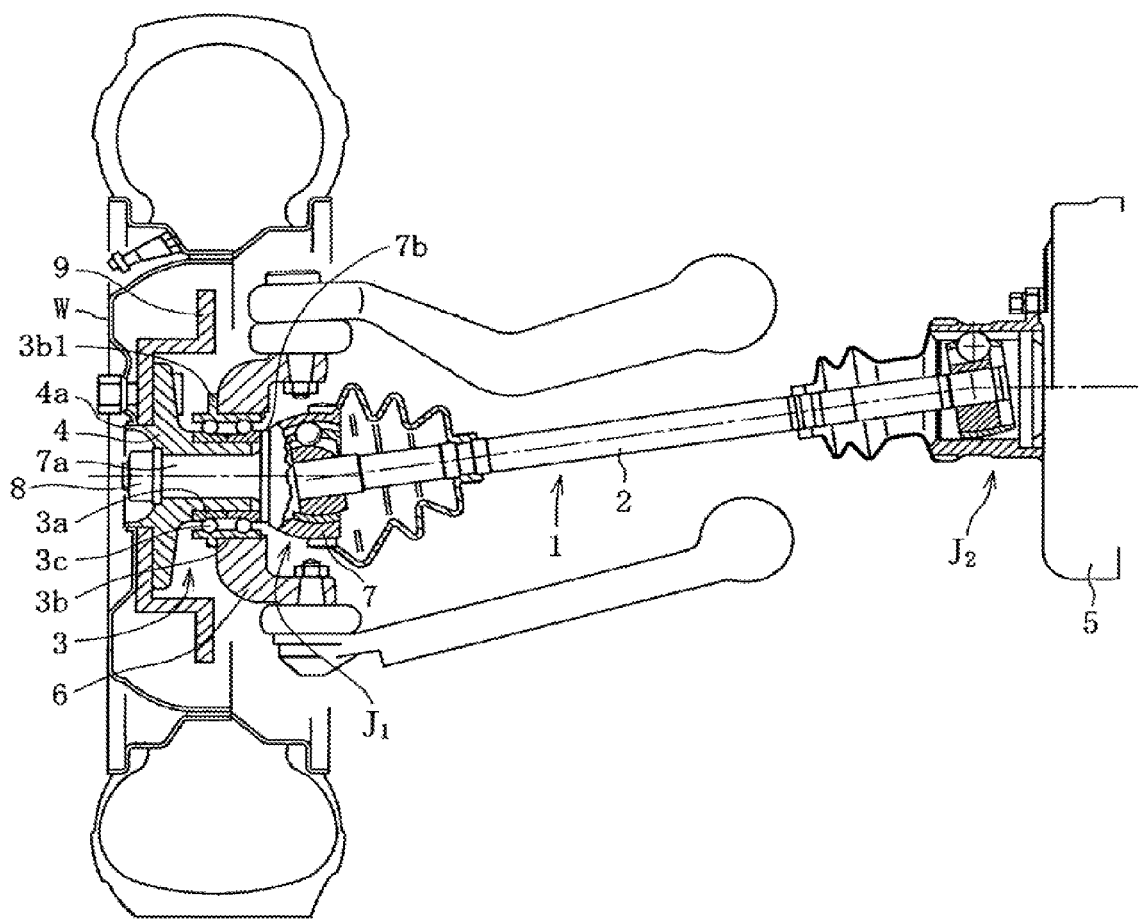
FIG. 30 is a cross-sectional view showing a schematic structure around a suspension device of a vehicle.

In each of the embodiments described above, there is shown an example where the outer peripheral surface 26a of the outer member 26 is formed entirely into a cylindrical surface, and the outer peripheral surface 26a is fit-in and incorporated to the inner peripheral surface 6a of the knuckle member 6. Alternatively, a flange 26c may be formed on the outer peripheral surface 26a of the outer member 26 and be bolted to the knuckle member 6, as shown in FIG. 29. In this case, the outer peripheral surface 26a of the outer member 26 and the inner peripheral surface 6a of the knuckle member 6 are fitted with each other by clearance fitting. The connection method of the hub wheel 10 and the outer joint member 31 is not particularly limited, and in addition to plastic bonding by press fitting the male part 51 to the female part 52 in a different shape as shown in the drawing, connection may be carried out through connection methods such as diameter expansion caulking, orbital forming, and welding. The hub wheel 10 and the outer joint member 31 may be connected by a nut, similarly to the conventional art.

Furthermore, in each of the embodiments described above, there is exemplified the bearing unit for wheel for the drive wheel including the outboard side constant velocity universal joint 30. Alternatively, the present invention can be applied also to a bearing unit for a driven wheel including no constant velocity universal joint.

The invention claimed is:

1. A bearing unit for wheel comprising:
an outer member having a plurality of outer races on an inner periphery thereof;
an inner member having a hub wheel being provided with a flange for attaching a wheel, and a plurality of inner races facing the outer races;
a plurality of rows of rolling elements arranged between the outer races and the inner races that face with each other; and
an outboard side constant velocity universal joint having an outer joint member, wherein:
a pilot portion, which is fitted to an inner periphery of the wheel, is arranged on a different member other than the hub wheel,
the hub wheel and the outer joint member of the outboard side constant velocity universal joint are plastically bonded by press fitting a male part having a tooth-shaped surface, arranged on one of the hub wheel and an outer joint member of the outboard side constant velocity universal joint to a female part arranged on the other of the hub wheel and the outer joint member of the outboard side constant velocity universal joint,
the female part is fitted to the male part with a plastic deformation generated by the press-fitting of the male part, and
a bonding between the male part and the female part is completed by the press-fitting of the male part.

2. The bearing unit for wheel according to claim 1, wherein the hub wheel is formed through cold forging.

3. The bearing unit for wheel according to claim 1, wherein an outer peripheral surface of the outer member is fit-in and incorporated to an inner peripheral surface of a knuckle member on a vehicle body side, and a maximum outer diameter dimension of the outboard side constant velocity universal joint is smaller than a minimum inner diameter dimension of the knuckle member.

4. A wheel supporting device comprising the bearing unit for wheel according to claim 1, a brake rotor, and a pilot portion arranged on the brake rotor.

\* \* \* \* \*